United States Patent
Lehmann et al.

(10) Patent No.: US 11,267,760 B2
(45) Date of Patent: Mar. 8, 2022

(54) METHOD FOR PRODUCING INSULATING MATERIAL OR AN INSULATING PRODUCT FOR THE REFRACTORY INDUSTRY, CORRESPONDING INSULATING MATERIALS AND PRODUCTS, AND USES

(71) Applicant: HÜTTENES-ALBERTUS CHEMISCHE WERKE GESELLSCHAFT MIT BESCHRÄNKTER HAFTUNG, Düsseldorf (DE)

(72) Inventors: Sandra Lehmann, Potsdam (DE); Klaus Riemann, Wunstorf (DE); Nils Zimmer, Garbsen (DE); Hermann Lieber, Langenhagen (DE); Jürgen Hübert, Langenhagen (DE); Fabio Sola, Hannover (DE); Heike Mushardt, Hannover (DE)

(73) Assignee: HÜTTENES-ALBERTUS CHEMISCHE WERKE GESELLSCHAFT MIT BESCHRÄNKTER HAFTUNG, Düsseldorf (DE)

( * ) Notice: Subject to any disclaimer, the term of this patent is extended or adjusted under 35 U.S.C. 154(b) by 30 days.

(21) Appl. No.: 16/617,329

(22) PCT Filed: May 30, 2018

(86) PCT No.: PCT/EP2018/064201
§ 371 (c)(1),
(2) Date: Nov. 26, 2019

(87) PCT Pub. No.: WO2018/220022
PCT Pub. Date: Dec. 6, 2018

(65) Prior Publication Data
US 2020/0262758 A1    Aug. 20, 2020

(30) Foreign Application Priority Data
May 30, 2017    (DE) .................... 10 2017 111 849.7

(51) Int. Cl.
C04B 33/04    (2006.01)
C04B 33/13    (2006.01)
C04B 33/32    (2006.01)

(52) U.S. Cl.
CPC ............ *C04B 33/04* (2013.01); *C04B 33/131* (2013.01); *C04B 33/1305* (2013.01);
(Continued)

(58) Field of Classification Search
CPC ... C04B 33/04; C04B 33/1305; C04B 33/131; C04B 33/1315; C04B 33/32;
(Continued)

(56) References Cited

U.S. PATENT DOCUMENTS

| 3,933,513 A | 1/1976 | Mellows |
| 5,061,526 A | 10/1991 | Robyn et al. |
| 9,181,136 B2 | 11/2015 | Courtois et al. |
| 2011/0105296 A1 | 5/2011 | Boussant-Roux et al. |

(Continued)

FOREIGN PATENT DOCUMENTS

| AT | 302150 | 1/1970 |
| CN | 101875561 A | 11/2010 |

(Continued)

OTHER PUBLICATIONS https://web.archive.org/web/20110211110031/http://en.wikipedia.org/wiki/Fumed_silica (Year: 2011).*

*Primary Examiner* — Karl E Group
*Assistant Examiner* — Cameron K Miller
(74) *Attorney, Agent, or Firm* — Duane Morris LLP; Gregory M. Lefkowitz; Brandon A. Chan

(57) ABSTRACT

What are described are a process for producing an insulating product for the refractory industry or an insulating material
(Continued)

Figure 1:

as intermediate for production of such a product, and a corresponding insulating material/insulating product. Likewise described are the use of a matrix encapsulation process in the production of an insulating product for the refractory industry and a corresponding insulating product and/or an insulating material as intermediate for production of such a product.

14 Claims, 10 Drawing Sheets

(52) U.S. Cl.
CPC .......... C04B 33/1315 (2013.01); C04B 33/32 (2013.01); *C04B 2235/349* (2013.01); *C04B 2235/3418* (2013.01); *C04B 2235/3427* (2013.01); *C04B 2235/48* (2013.01); *C04B 2235/5454* (2013.01); *C04B 2235/77* (2013.01); *C04B 2235/9607* (2013.01)

(58) Field of Classification Search
CPC .... C04B 2235/3418; C04B 2235/3427; C04B 2235/349; C04B 2235/48; C04B 2235/5454; C04B 2235/77; C04B 2235/9607

See application file for complete search history.

(56) References Cited

U.S. PATENT DOCUMENTS

| | | | |
|---|---|---|---|
| 2012/0118574 A1* | 5/2012 | Li ................... | C04B 38/009 166/308.1 |
| 2013/0153222 A1* | 6/2013 | Pisklak ............ | C04B 14/104 166/293 |
| 2016/0060169 A1* | 3/2016 | Byrd ............... | C04B 28/04 106/676 |
| 2017/0152193 A1 | 6/2017 | Desiles et al. | |
| 2017/0157667 A1* | 6/2017 | Desiles .......... | C04B 35/62655 |

FOREIGN PATENT DOCUMENTS

| | | | | |
|---|---|---|---|---|
| DE | 1173828 | | 7/1964 | |
| DE | 2037937 | | 2/1972 | |
| DE | 2037937 A1 * | 2/1972 | ............ C04B 38/08 |
| DE | 3509357 | | 7/1986 | |
| DE | 102008063815 | | 6/2010 | |
| DE | 102015120866 | | 6/2017 | |
| EP | 0854124 | | 7/1998 | |
| EP | 0934785 | | 8/1999 | |
| EP | 0934785 A1 * | 8/1999 | ............ B22C 9/088 |
| JP | H072559 | | 1/1995 | |
| WO | 2004018090 | | 3/2004 | |
| WO | 2004101137 A1 | 11/2004 | |
| WO | 2016008970 | | 1/2016 | |
| WO | 2017093371 | | 6/2017 | |

* cited by examiner

METHOD FOR PRODUCING INSULATING MATERIAL OR AN INSULATING PRODUCT FOR THE REFRACTORY INDUSTRY, CORRESPONDING INSULATING MATERIALS AND PRODUCTS, AND USES

CROSS-REFERENCE TO RELATED APPLICATIONS

This application is a § 371 national stage entry of International Application No. PCT/EP2018/064201, filed on May 30, 2018, which claims priority to German Patent Application No. 10 2017 111 849.7, filed on May 30, 2017, the entire contents of which are incorporated herein by reference.

The present invention relates to a process for producing an insulating product for the refractory industry or an insulating material as intermediate for production of such a product, and to a corresponding insulating material/insulating product. The present invention likewise relates to the use of a matrix encapsulation process in the production of an insulating product for the refractory industry and to a corresponding insulating product and/or to an insulating material as intermediate for production of such a product. The invention is defined in the appended claims and the corresponding passages of the description.

In the context of the present documents, the expression "refractory industry" preferably encompasses the use of the articles of the invention in the production of or as refractory fittings and linings in non-iron, iron and steel applications, in the cement and lime industry, in chemistry and petrochemistry, and in refuse incineration plants. Applications of the articles of the invention as described in the present text in other branches of industry, particularly in the foundry industry, are not part of the present invention.

In the field of refractory applications, the use of various materials that are also lightweight is currently known, especially of expanded clay, perlite, expanded perlite, vermiculite and fibers such as ceramic fibers or mineral fibers (calcium silicate). "Spheres" (round hollow balls) have also already been described as constituents of refractory compounds. It is likewise customary in the field of refractory applications to increase porosity by using expanding particles during combustion.

In the field of high-refractory applications, for example in linings and/or fittings in furnace construction, hollow spherical corundum (empirical formula $Al_2O_3$) is generally used, especially when a low weight is desired. Hollow spherical corundum is fire-resistant up to about 2000° C. But disadvantages are its high bulk density of about 750 to 1000 g/L (depending on the production process) and its comparatively good thermal conductivity: the high bulk density makes it difficult to manufacture, for example, lightweight linings from hollow spherical corundum. The high thermal conductivity means that the heat losses and hence energy losses in high-refractory installations modified with hollow spherical corundum are comparatively high.

The terms "refractory" and "high-refractory" are used throughout the present text in accordance with the corresponding definitions in the standard DIN 51060:2000-06.

Known disadvantages in the production of currently standard refractory and high-refractory substances are that production of homogeneous, regularly shaped particles requires conversion of the ceramic starting material to a melt phase, for which high temperatures and correspondingly large amounts of energy are needed. In order to lower the energy requirement, it is necessary to use fluxes, but these lower the fire resistance of the resultant refractory or high-refractory material. A further known approach for providing refractory particulate raw materials is, for example, processes for producing highly porous or hollow spherical insulating materials.

The use of high temperatures and large amounts of energy in the manufacture of industrial products also runs counter, inter alia, to the aims of the Paris Agreement: the "Paris Agreement" is a treaty between 195 member states of the United Nations Framework Convention on Climate Change (UNFCCC) with the aim of protecting the climate following the Kyoto Protocol. The Paris Agreement was finalized in December 2015 at the UN Climate Conference in Paris and envisages the limitation of man-made global warming to less than 2° C. compared to preindustrial values. The "Climate Action Plan 2050" that resulted therefrom for Germany was finalized in November 2016 and envisages a reduction in the output of greenhouse gases by about 50% compared to 1990 values for the industrial sector by 2030. Against this background, the refractory industry is facing a double challenge, firstly of lowering the energy demand for the production of its own products and secondly of further improving the insulating effect of refractory products in order in this way also to contribute to saving energy in the operation of high-temperature furnaces.

Document DE1173828 discloses a process for producing hollow spheroidal bodies from ceramic raw materials.

Document DE2037937 describes a process for producing lightweight ceramic shaped bodies.

Document DE2100802 describes a process for producing lightweight refractory bricks for use at high temperatures.

Document DE2352188 describes a refractory thermal insulation panel and a process for production thereof.

Document U.S. Pat. No. 5,061,526 describes a process for producing a porous refractory material.

Document EP0934785A1 describes a thermally insulating composition comprising hollow round spheres for use in molds for metal casting.

Document EP0854124A1 describes a refractory ceramic brick.

Document EP216835A1 describes a material composition for production of a refractory material and the use thereof, and a refractory shaped body and a process for production thereof.

Document DE102008063815A1 describes an open-pore shaped body.

Document DE 10 2015 120 866 A1 (corresponding to WO 2017/093371 A1) specifies a process for producing refractory composite particles and feeder elements for the foundry industry, corresponding feeder elements and uses.

Nevertheless, in the light of the prior art, there is a need in the refractory industry for particulate refractory or high-refractory materials which have a low thermal conductivity, high mechanical strength coupled with low weight (i.e. low bulk density) and a regular particle shape of maximum homogeneity for production insulating products for the refractory industry or as an insulating material as intermediate for production of such products.

It was a primary object of the present invention to provide an improved process for producing an insulating product for the refractory industry or an insulating material as intermediate for production of such a product, which can be adapted without any particular trouble to the practical demands with regard to the properties of the particles present in the insulating material. The process to be specified was to lead to an insulation material comprising particles having a grain size of 5 mm or less. The particles—depending on the individual configuration of the process to be specified— were in particular to have a low bulk density, high thermal stability, excellent insulation characteristics, i.e. low thermal conductivity and/or high mechanical strength (grain strength).

Preferably, the process to be specified was to include the use or enable the production of filler particles that have one or more, preferably all, of the following properties:
particularly high thermal stability,
excellent insulation characteristics,
good pourability,
high sphericity,
flowability,
a low bulk density of less than 750 g/L, preferably of less than 400 g/L,
and/or
particularly high mechanical strength.

The process to be specified for production of an insulating product for the refractory industry or an insulating material as intermediate for production of such a product was to be flexibly adjustable with regard to the production and use of filler particles of variable size; more particularly, the process was to enable the production and use of filler particles having a grain size of less than 5 mm (preferably less than 2 mm) in the production of an insulating product for the refractory industry or an insulating material as intermediate for production of such a product. The filler particles to be produced and used were to be of variable composition. By virtue of this variability and flexibility of the process to be specified, it is to be possible to produce an insulating product for the refractory industry or an insulating material as intermediate for production of such a product that has material properties individually matched to the demands of the individual case. The process to be specified for production of an insulating product for the refractory industry or an insulating material as intermediate for production of such a product is thus also to be more independent of the market availability of filler particles of defined size and composition than the existing processes.

A further aspect of the primary object of the present invention was to provide a process for producing an insulating product for the refractory industry or an insulating material as intermediate for production of such a product that has lower energy consumption compared to known processes of this kind.

It was a further object of the present invention to specify a corresponding insulation material or insulating product. Further object of the present invention will be apparent, mutatis mutandis, from the above remarks and will be apparent from the corresponding elucidations in the text that follows.

The invention and combinations of preferred parameters, properties and/or constituents of the present invention that are preferred in accordance with the invention are defined in the appended claims or in the aspects specified in the description. Preferred aspects of the present invention are also specified or defined in the description that follows and in the examples.

It has now been found that the primary object and further specific objects and partial objects is/are achieved by a (first inventive) process for producing an insulating product for the refractory industry or an insulating material as intermediate for production of such a product, having the following steps:

(a) producing composite particles having a grain size of less than 5 mm, preferably less than 2 mm, determined by sieving, in a matrix encapsulation process having the following steps:

(a1) producing droplets of a suspension composed of at least the following starting materials:
as dispersed phases
(i) one or more refractory substances selected from the group consisting of refractory solids and precursors of refractory solids,
(ii) additionally one or more density-reducing substances selected from the group consisting of lightweight fillers having a respective bulk density in the range from 10 to 350 g/L and pyrolyzable fillers,
(iii) colloidal, preferably anionic, silicon dioxide in addition to constituents (i) and (ii); and as continuous phase
(iv) a solidifiable liquid, (a2) solidifying the solidifiable liquid, such that the droplets harden to give hardened droplets and the refractory substance(s) and the density-reducing substance(s) are encapsulated in the solidifying continuous phase, (a3) treating the hardened droplets so as to result in said composite particles, the treating comprising a thermal treatment.

One finding on which the invention is based is that matrix encapsulation (encapsulation) of the starting materials specified in step (a1) (see points (i) to (iv) in step (a1)) can produce composite particles having the primary properties listed above.

The composite particles produced by the process of the invention have a grain size of less than 5 mm, preferably of less than 2 mm, determined by sieving. Determination by sieving is effected in accordance with DIN 66165-2 (4.1987) using Method F specified therein (machine sieving with moving individual sieve or sieve set in gaseous static fluid). A vibratory sieving machine of the RETSCH AS 200 control type is used; the amplitude is set here to level 2; there is no interval sieving; the sieving time is 1 minute.

The term "refractory solids" encompasses solids that are referred to as "refractory" according to DIN 51060:2000-06; the term "refractory solids" additionally encompasses the solids from the group consisting of aluminum oxide, zirconium oxide, titanium dioxide, graphite, silicon dioxide, magnesium oxide, calcium oxide, calcium silicate, sheet silicates (preferably mica), aluminum silicates, magnesium aluminum silicate (preferably cordierite), silicon carbide, boron nitride, mixed oxides containing one or more metal atoms from the aforementioned metal oxides, and mixed silicates containing one or more metal atoms from the aforementioned metal silicates.

"Precursors of refractory solids" are materials which, on treatment of the hardened droplets (step (a3)), are transformed to "refractory solids" as defined above, for example by a heat treatment.

In the context of the present invention, a particle or material (for example an amount of particles of the same composition) is considered to be thermally stable if the particle or material neither melts nor softens or even breaks down with loss of its three-dimensional shape below a given upper temperature limit (e.g. 1600° C. or 1700° C., preferably 1600° C.). An amount of particles of the same composition is considered to be thermally stable especially when it does not sinter at a particular temperature in the sintering test. With regard to the performance of the sintering test, see "Method of determining thermal stability (sintering test)" below.

The feature "producing droplets of a suspension from at least the following starting materials" comprises the "producing of droplets of a suspension from exclusively the following starting materials" and the "producing of droplets of a suspension from the following starting materials and further starting materials".

A "matrix encapsulation process" is understood in the present text to mean a process in which droplets of a dispersion are first prepared, said dispersion comprising a substance in the solid or liquid state suspended in a matrix (continuous phase). The droplets are used to produce composite particles by solidification and optionally subsequent treatment. The process of the invention comprises, in its step (a), a specific matrix encapsulation process with the above-defined component steps. A typical process for production of core-shell particles differs from the matrix encapsulation process in that the shell material in core-shell particles encases just a single core. This single core of a typical core-shell particle typically does not comprise any binder that binds other constituents of the core. Typically, and this is also especially true of the composite particles produced by means of the specific matrix encapsulation process in step (a) of the process of the invention, a composite particle produced by means of the matrix encapsulation process comprises more than 5, preferably more than 50, discrete microparticles consisting of refractory solid; see below for preferred refractory solids. Such composite particles are preferred in accordance with the invention.

"Density-reducing substances" are substances which, when used in the process of the invention, have the effect of achieving a reduced bulk density of the resultant composite particles in step (a3), as compared with a noninventive (comparative) process that has been conducted in an identical manner except that, for the purpose of the comparison, these "density-reducing substances" are not used. Depending on the treatment of a hardened droplet, a pyrolyzable filler used may or may not expand or be pyrolyzed. Only when a pyrolyzable filler used is pyrolyzed (in step (a3)) does it fulfill the "density-reducing" criterion.

"Lightweight fillers" used in accordance with the invention are fillers each having a bulk density in the range from 10 to 350 g/L, determined to DIN EN ISO 60 2000-01. Lightweight fillers preferred for use in the process of the invention are spheres, preferably spheres of fly ash, for example "Fillite 106" spheres from Omya GmbH, or glass, for example the glass with the "GHL 450" name from LUH Georg H. Luh GmbH, the product with the "JJ Glass Bubbles" name from Jebsen &Jessen GmbH&Co. KG, the product with the "Q-Cel®300" name from Potters Industries or the "K1", "K15" or "K20" products from 3M.

"Pyrolyzable fillers" are fillers that are pyrolyzed partly or completely, preferably completely, on treatment of the hardened droplets in step (a3), for example in the course of heating. A pyrolyzable filler may simultaneously be a lightweight filler having a respective bulk density in the range from 10 to 350 g/L.

Composite particles that are produced in step (a) of the process of the invention, owing to the use of the density-reducing substances in step (ii), have a particularly low bulk density, but one adjusted individually according to the demands of the individual case, and, especially in the case of use of pyrolyzable fillers, have a high porosity, but one adjusted individually according to the demands of the individual case, such that the resulting individually produced composite particles have a high insulating effect with simultaneously low bulk density.

As well as the above-specified density-reducing substances envisaged in accordance with the invention, additional further density-reducing substances used in step (a1), point (ii), of the process of the invention may be blowing agents. "Blowing agents" are substances that expand on treatment of the hardened droplets in step (a3), for example in the course of heating, or release blowing gases and hence produce cavities in the composite particle.

"Colloidal silicon dioxide" which is used as starting material in step (a1), point (iii) of the process of the invention, is preferably a dispersion comprising an aqueous (i.e. water-containing) continuous phase and a disperse phase comprising nanoparticulate silicon dioxide, preferably having an average particle size (determined by electron microscopy measurement) in the range from 5 to 30 nm, preferably in the range from 7 to 25 nm. The specific surface area of the particulate silicon dioxide is preferably in the range from 100 to 300 $m^2/g$, more preferably in the range from 200 to 300 $m^2/g$, determined by the "BET method" (see S. Brunauer, P. H. Emmett, E. Teller: J. Amer, Chem. Soc. 60, 309-312 (1938)). The silicon dioxide content of the dispersion (reported as $SiO_2$) is preferably within a range from 10% to 50% by weight, more preferably within a range from 15% to 40% by weight, most preferably within a range from 18% to 35% by weight, based on the total weight of the dispersion. The "colloidal silicon dioxide" is preferably an anionic colloidal silicon dioxide. The colloidal silicon dioxide is more preferably a surface-modified anionic colloidal silicon dioxide. A "dispersion" is understood here to mean the entirety of the continuous phase (or phases) and dispersed phase (or phases) that form the colloidal silicon dioxide. Preferred colloidal silicon dioxides for use in the above-identified process of the invention are the "Ludox® TMA" product from W.R. Grace & Co., the "Lithosol® 1530" product from Zschimmer & Schwarz GmbH & Co. KG, the "Levasil® 200E/20%" product, the "Levasil® 200B/30%" product (both H. C. Starck) and the "Köstrosol® 0820BS" product from Chemiewerk Bad Kostritz GmbH.

In the composite particles produced by the above-specified process of the invention, the colloidally dispersed silicon dioxide particles used in step (a1) are in the form of nanoparticulate silicon dioxide if the temperature chosen for the thermal treatment in step (a3) (or another thermal treatment applied to the composite particles, for example a sintering operation) is not at such a high level that the nanoparticles are fused or sintered completely to one another with loss of the particle shape. The detection of the presence of silicon dioxide in the nanoparticulate form can be conducted by means of scanning electron microscopy ("SEM") or transmission electron microscopy ("TEM").

The composite particles or insulation materials produced by the above-specified process of the invention that comprise colloidal silicon dioxide as constituent (iii) are notable for a particularly high grain strength with simultaneously low bulk density, refractory properties and a high insulating effect. They are therefore particularly suitable for production of insulating products for the refractory industry, where high mechanical stability is important. Without any guarantee of correctness, it is assumed that the particularly good grain strength of the composite particles or insulation materials produced by the above-specified process of the invention originates from an interaction—synergistic in some cases—of two or all three of the factors of (j-1) thermal treatment in step (a3) within the preferred temperature range (see below), (j-2) curing of the preferred solidifiable liquid (see below) in step (a2), and (j-3) the effect of the colloidal silicon dioxide in step (a1) as binder.

The energy expenditure in the thermal treatment (especially in step (a3)) in order to achieve a desired high grain strength of composite particles for use in the refractory industry can therefore advantageously be reduced by the process of the invention compared to other similar processes.

Preference is given to a process of the invention as described above (especially a process described above or hereinafter as preferred) wherein in step (a1) droplets are provided by means of one or more nozzles, preferably vibration nozzles, and/or in step (a2) the solidifying of the solidifiable liquid is induced by cooling, drying or chemical reaction.

The use of one or more nozzles, preferably vibration nozzles, is preferred in step (a1) in order to produce the composite particles in a time-efficient manner and with maximum homogeneity of grain size.

Preference is given to a process of the invention as described above (especially a process described above or hereinafter as preferred) wherein the solidifiable liquid used in step (a1) is a liquid solidifiable by chemical reaction and the solidifying of the solidifiable liquid in step (a2) is induced by chemical reaction.

The solidifying of the solidifiable liquid by chemical reaction has the advantage that this operation is generally irreversible and is additionally fast enough, such that the solidifiable liquid generally retains the shape of the droplet on dropwise addition and hence on solidification of the solidifiable liquid. Solidifications by physical methods, for example cooling or drying, are reversible in some cases and can be (at least partly) reversed in these cases, for example by the supply of heat or moisture.

Particular preference is given to a process of the invention as described above (especially a process described above or hereinafter as preferred) wherein the solidifiable liquid is a liquid solidifiable by cation exchange reaction, preferably a liquid solidifiable by reaction with calcium ions and/or barium ions and/or manganese ions, preferably by reaction with calcium ions.

Cation exchange reactions in practice have the advantage that they are regularly complete within a comparatively short period of time.

In step (a2), preference is given to the performance of a cation exchange reaction in which the solidifiable liquid contains monovalent cations and is contacted with calcium ions in order thus to solidify the solidifiable liquid; rather than calcium ions, it is alternatively possible to use barium ions or manganese ions. In the preferred procedure, monovalent cations present in the solidifiable liquid are exchanged for calcium ions, in order thus to solidify the solidifiable liquid. Calcium ions have a balanced ratio between charge and ion mobility. It is generally the case that: the charge of the cation that is to be exchanged with the monovalent cation present in the solidifiable liquid should be at a maximum in order that sparingly soluble compounds form on cation exchange. But the cation should also have maximum ion mobility in order that the desired chemical reaction proceeds with maximum speed. The ion mobility of cations decreases with increasing cationic charge.

Particular preference is given to a process of the invention as described above (especially a process described above or hereinafter as preferred) wherein the solidifiable liquid is a liquid solidifiable by reaction with calcium ions, comprising one or more binders selected from the group consisting of alginate, polyvinyl alcohol (PVA), chitosan and sulfoxyethyl cellulose, and/or (preferably "and")

an aqueous solution, wherein the solidifiable liquid is preferably an aqueous alginate solution, wherein the solidifiable liquid is more preferably an aqueous sodium alginate solution.

Alginate solutions, especially sodium alginate solutions, preferably in the form of an aqueous solution, are particularly suitable for use as a liquid solidifiable by reaction with calcium ions in a process of the invention since they are environmentally friendly, degradable and, in particular, non-toxic. Moreover, such alginate solutions can be solidified in a reproducible and standardized manner. The composite particles obtained in in-house studies, produced using alginate solutions as solidifiable liquid, had a homogeneous construction with uniformly distributed or arranged particles of refractory substances.

Preference is given to a process of the invention as described above (especially a process described above or hereinafter as preferred) wherein the or at least one of the lightweight fillers used in step (a) as density-reducing substance of component (ii), preferably having a grain size of less than 0.8 mm, more preferably less than 0.5 mm, most preferably less than 0.3 mm, determined by sieving (see above for method of determination), is selected from the group consisting of:

inorganic hollow beads, organic hollow beads, particles of porous and/or foamed material, preferably of glass, rice husk ash, core-shell particles and calcined kieselguhr and/or wherein the or at least one of the pyrolyzable fillers used in step (a) as component (ii) is selected from the group consisting of:

polymer beads, preferably "Expancel® 091 DE 80 d30" polymer beads from Akzo Nobel or "SPHERE ONE EXTENDOSPHERES™ PM 6550 Hollow Plastic Spheres" polymer beads from KISH Company Inc.

and styrofoam beads, preferably "F655-N" styrofoam beads from BASF.

Particular preference is given to a process of the invention as described above (especially a process described above or hereinafter as preferred) wherein the total amount of lightweight fillers used is in the range of up to 30% by weight, more preferably in the range from 1% to 10% by weight, especially preferably in the range from 2% to 5% by weight, based on the total mass of the suspension produced in step (a1), and/or the total amount of pyrolyzable fillers used is in the range of up to 30% by weight, more preferably in the range from 1% to 20% by weight, especially preferably in the range from 2% to 10% by weight, based on the total mass of the suspension produced in step (a1).

The total amount of the density-reducing substances used is preferably in the range from 1% to 20% by weight, more preferably in the range from 2% to 10% by weight, based on the total mass of the suspension produced in step (a1).

The above lightweight fillers used as component (ii) may be used individually or in combination with one another.

The above pyrolyzable fillers used as component (ii) may be used individually or in combination with one another.

The above lightweight fillers used and pyrolyzable fillers used as component (ii) may each be used individually or in combination with one another.

The above-specified blowing agents optionally usable in the process of the invention as additional further density-reducing substances in addition to the density-reducing substances envisaged in accordance with the invention are preferably selected from the group consisting of:
- carbonates, hydrogencarbonates and oxalates, preferably with cations from the group consisting of alkali metals and alkaline earth metals, preferably calcium carbonates, hydrogencarbonates and oxalates,
- coconut shell meal, preferably coconut shell meal with the "Coconit 300" name from Mahlwerk Neubauer-Friedrich Geffers GmbH,
- walnut shell meal, preferably walnut shell meal with the "Walnusschalenmehl 200m" name from Ziegler Minerals,
- grape seed flour, preferably grape seed flour with the "Traubenkernmehl M100" name from A+S BioTec,
- olive kernel flour, preferably olive kernel flour with the "OM2000" or "OM3000" name from JELU-Werk,
- starch,
- wheat flour, preferably wheat flour with the "Mehl 405" name from Hummel,
- corn flour, preferably corn flour with the "Maismehl MK100" name from Hummel,
- potato dextrin,
- sugar, e.g. sucrose,
- plant seeds,
- wood flour, preferably wood flour with the "Holzmehl Ligno-Tech 120 mesh TR" name from Brandenburg Holzmühle,
- and
- rice husk ash, preferably rice husk ash with a high carbon content, for example a rice husk ash with the "Nermat AF (<80 μm)" name from Refratech.

The above blowing agents optionally usable as further additional component (ii) may be used individually or in combination with one another, preferably in a total amount in the range of up to 30% by weight, more preferably in the range from 1% to 20% by weight, especially preferably in the range from 3% to 10% by weight, based on the total mass of the suspension produced in step (a1).

The aforementioned density-reducing substances (for example lightweight fillers or hydrolyzable fillers, also blowing agents) for production of composite particles having particularly low bulk density are available on the market to a high degree. Their use in the process of the invention enables the reproducible production of lightweight products having good insulation for the refractory industry or insulating materials as intermediates for production of such products.

Preference is given to a process of the invention as described above (especially a process described above or hereinafter as preferred) wherein the or at least one of the refractory solids used in step (a1) as refractory substance of component (i) is selected from the group consisting of:
- oxides, nitrides and carbides, each comprising one or more elements from the group consisting of Si, Al, Zr, Ti, Mg and Ca,
- and
- mixed oxides, mixed carbides and mixed nitrides, each comprising one or more elements from the group consisting of Si, Al, Zr, Ti, Mg and Ca, wherein the or at least one of the refractory solids used in step (a1) as refractory substance of component (i) is preferably selected from the group consisting of:
- aluminum oxide (e.g. CAS No. 21645-51-2),
- zirconium oxide (e.g. CAS number 1314-23-4),
- titanium dioxide (e.g. CAS number 13463-67-7),
- silicon dioxide (e.g. quartz with CAS number: 14808-60-7 or vitreous $SiO_2$ with CAS numbers: 60676-86-0),
- magnesium oxide (e.g. CAS number: 1309-48-4),
- calcium oxide (e.g. CAS number 1305-78-8),
- calcium silicate (e.g. CAS number: 1344-95-2),
- sheet silicates, preferably mica,
- aluminum silicates,
- magnesium aluminum silicate, preferably cordierite,
- silicon carbide,
- and
- boron nitride and/or the precursor or at least one of the precursors of refractory solids used in step (a1) as refractory substance of component (i) is selected from the group consisting of
- aluminum hydroxide (e.g. CAS number: 1344-28-1),
- magnesium hydroxide (e.g. CAS number: 1309-42-8),
- sheet silicates, preferably kaolinite, montmorillonite and illite,
- clays, preferably kaolin and bentonite,
- phosphates such as tricalcium phosphate (e.g. CAS number: 7758-87-4)
- and
- carbonates such as calcium carbonate and magnesium carbonate (e.g. CAS numbers: 546-93-0 (anhydrous), 13717-00-5 (monohydrate), 5145-48-2 (dihydrate), 14457-83-1 (trihydrate), 61042-72-6 (pentahydrate)).

Particular preference is given to a process of the invention as described above (especially a process described above or hereinafter as preferred) wherein the total amount of the refractory substances used in step (a1) is in the range from 1% to 70% by weight, more preferably in the range from 5% to 50% by weight, most preferably in the range from 10% to 30% by weight, based on the total amount of the suspension produced in step (a1).

All the aforementioned species may also be used in a mixture with one another, for example carbonates/phosphates in the form of bone ash.

Refractory Substances:

The aforementioned refractory solids may be used individually or in combination. The aforementioned precursors may be used individually or in combination. It is possible to use exclusively refractory solids or exclusively precursors or both in combination with one another.

Sheet Silicates:

Preferred sheet silicates for use as refractory solids are as follows:
- "Pyrax® RG-140" from C. H. Erblslöh
- "Mica G" from Aspanger Bergbau und Mineralwerke GmbH
- "Mica—MG 160" from Denain-Anzin Minéraux
- and
- mica from Aspanger Bergbau und Mineralwerke GmbH with the "Glimmer CMG" name.

The above preferred sheet silicates may be used individually or in combination.

Oxides:

In some cases, however, it is advantageous to use particular oxides as refractory substance of component (i) in step (a1), where at least one of these oxides is selected from the group consisting of:
- aluminum oxide (e.g. CAS No. 21645-51-2),
- zirconium oxide (e.g. CAS number 1314-23-4),
- titanium dioxide (e.g. CAS number 13463-67-7),
- silicon dioxide (e.g. quartz with CAS number: 14808-60-7 or vitreous SiO2 with CAS numbers: 60676-86-

0), as particulate solid (as opposed to colloidal silicon dioxide, as per step (a1), point (iii) of the process of the invention), magnesium oxide (e.g. CAS number: 1309-48-4), and calcium oxide (e.g. CAS number 1305-78-8).

The aforementioned oxides may be used individually or in combination.

Preferred aluminum oxides here are the aluminum oxide "Nabalox® NO315" from Nabaltec AG, the aluminum oxide "Alodur® EK S1" from Treibacher Schleifmittel, the aluminum oxide "Alumina DF2" from MAL Magyar Aluminum and the aluminum oxide "Edelkorund weiß EK—Filterstaub" from Wester Minerals.

A preferred combination of metal oxides is a mixture of aluminum oxide and zirconium oxide, for example "Alodur® ZKSF" from Treibacher Schleifmittel.

Preferred silicon oxides here are the silica "Sillimat GS (<80 μm)" from Refratech, the silicon oxide "Kalzinierte Reisspelzen" from Ziegler Minerals, the silicon oxide "Aerosil 200" from Evonik, the silicon oxide "SiO2 RW filler Q1 plus" from RW Silicium GmbH and the silicon oxide "Millisil-Mehl W8" from Quarzwerke.

A preferred calcium silicate is the calcium silicate "China Wollastonite TMM SG" from Possehl Erzkontor.

Aluminum Silicates:

Preferred aluminum silicates for use as refractory solids or precursors are magnesium aluminum silicates and the following aluminum silicates:

"Andalusit 200 mesh", "Andalusit 120 mesh" or "Kysil 58" from Europe Minerals,
"Marlusit DIN 80" from Cofermin Rohstoffe,
"Kyanit 100mesh/200mesh" from Possehl Erzkontor,
"Kyanit 40-120mesh" from Ziegler Mineralstoffe,
"Kaolinschamotte PrimaCal 50" from Sibelco Deutschland Westerwald,
"Porzellanmehl" from Franz Mandt,
"Molochit 120/200" from IMERYS UK
and
mullite.

Magnesium aluminum silicates and/or the aforementioned preferred aluminum silicates may be used individually or in combination.

Preferred magnesium aluminum silicates for use as refractory solids are cordierites, preferably "Cordierit C 65" from České Lupkové Závody SA, "Cordierit B" from Alroko GmbH & Co KG and "Cordierit 0-1 mm" or "Cordierit DIN 70" from Spitzer Rohstoffhandelsgesellschaft mbH.

These preferred magnesium aluminum silicates may be used individually or in combination.

The aforementioned compounds or mixtures may be used in combination with one another as refractory solids in the context of the present invention. The person skilled in the art is able to control, for example, the desired thermal stability of the composite particles and the bulk density, which is dependent thereon only to a particular degree, via the type and amount of refractory solids. The same applies to the preferred precursors of refractory solids that are specified hereinafter, to combinations of these preferred precursors and to combinations of preferred precursors of refractory solids with preferred refractory solids as described above.

Precursors:

A preferred mixture for use as precursors of refractory solids is bone ash, for example "CALTAN Knochenasche" from Neue Leimfabrik Tangermunde GmbH.

Particularly preferred kaolins for use as precursors of refractory solids are:

"Chinafill 100" or "Kaolin TEC" from Amberger Kaolinwerke
"Kärlicher Blautonmehl" from Kärlicher Ton- and Schamottewerke Mannheim & Co. KG
"Satintone W" from BASF AG
and
"Kaolin Burgess No. 20" or "Kaolin Burgess BSC SD" from Omya The above particularly preferred kaolins may be used individually or in combination.

Particularly preferred bentonites for use as precursors of refractory solids are:

"Bentone 27" or "Bentone EW" from Elementis Specialities,
"Bentonit B" (e.g. CAS number: 1302-78-9) from C. H. Erbsloh
and
"Bentonit Volclay" from Süd Chemie.

The above particularly preferred bentonites may be used individually or in combination.

The use of the aforementioned preferred refractory substances leads to particularly thermally stable (refractory) composite particles.

It will be apparent that the refractory substances in step (a1) are preferably in the form of nonaggregated and nonagglomerated particles, where the ratio of the maximum grain size (as defined above) of the particles of the refractory substances to the maximum grain size of the composite particles produced by the process of the invention is preferably in the range from 0.01 to 0.2. In this way, many particles of the refractory substances may be disposed in a single composite particle.

Refractory substances used in step (a1) are preferably particles, preferably particles of refractory substances, preferably refractory solids having a grain size of less than 0.1 mm, determined by sieving to DIN 66165-2 (4.1987) using Method D specified therein (machine sieving with a static individual sieve in gaseous moving fluid, with air jet sieve).

Preference is given to a process of the invention as described above (especially a process described above or hereinafter as preferred) wherein the treating in step (a3) is conducted in such a way that the bulk density of the resulting composite particles is lower than the bulk density of the hardened droplets in the dried state (this is accomplished particularly easily, for example, with use of density-reducing substances, preferably pyrolyzable fillers, when the treatment is conducted in such a way that it leads to the pyrolyzing of the pyrolyzable fillers) and/or said composite particles have a bulk density <750 g/L, preferably <500 g/L, more preferably <350 g/L.

In the context of the present invention, it has been recognized that, in the case of specific selection of constituents (i), (ii), (iii) and (iv) used in step (a1), by a controlled treatment of the hardened droplets in step (a3), a reduction in the bulk density which is advantageous or required in many cases is achievable (in that constituents are pyrolyzed, for example, or are converted with release of blowing gases). There is surprisingly no adverse effect here on the dimensional stability or thermal stability of the composite particle formed from the hardened droplet.

Composite particles having a bulk density of <750 g/L, preferably <500 g/L, more preferably <350 g/L, combine the advantages of a low bulk density, a high insulating effect and an adequate thermal stability; their use in the process according to the invention is therefore particularly preferred.

In many cases, preference is given to a process of the invention as described above (especially a process described above or hereinafter as preferred) wherein at least some of the resultant composite particles in step (a3) have a grain size in the region of less than 5.0 mm, preferably of less than 2.0 mm, determined by sieving. Composite particles having a grain size of less than 2.0 mm form the fine grain in an insulating refractory material and therefore have particularly good processability to give an insulating material for the refractory industry or a corresponding insulating product; their production in step (a) of the process of the invention and their use in step (b) (see below) is preferred. Preferably, at least 90% by weight, particularly preferably at least 95% by weight, of the composite particles produced in step (a), based on the total mass of the composite particles produced in step (a), have a grain size of 2.0 mm or less, determined by sieving.

Preference is frequently also given to a process of the invention as described above (especially a process described above or hereinafter as preferred) wherein component (ii) comprises one or more pyrolyzable fillers as density-reducing substance(s) and the treating in step (a3) is conducted in such a way that the pyrolyzable filler(s) are pyrolyzed and hence form cavities in the resultant composite particle.

The forming of cavities in step (a3) with use of pyrolyzable fillers is one aspect of the present invention since the bulk density of the resultant composite particles is thus reduced and the insulating effect increased. The amount and grain size of the pyrolyzable fillers are relevant parameters for the bulk density and porosity of the resulting composite particles.

Preference is given to a process of the invention as described above (especially a process described above or hereinafter as preferred) wherein component (i) comprises one or more precursors of refractory solids as refractory substances and the treating in step (a3) comprises a thermal treatment in which the precursors are converted to a refractory solid (this can typically be detected by means of XRD analysis), preferably wherein the precursor or at least one of the precursors of refractory solids is a clay or clay-containing rock and the treating in step (a3) comprises a thermal treatment at a temperature in the range from 900 to 980° C., such that the clay is converted to a refractory solid, wherein the clay preferably contains kaolinite and/or illite (this can typically be detected by means of XRD analysis).

In-house studies have shown that the process of the invention, even at comparatively low temperatures in step (a3) in the range from 900 to 980° C., composite particles containing colloidal silicon dioxide as constituent (iii) are obtained with very high mechanical strength (grain strength). It has also been found that the development of the mechanical strength of the composite particles by the thermal treatment in step (a3) of the process of the invention at a temperature in the range from 900 to 980° C. is time-dependent in the sense that a longer thermal treatment within the temperature range specified results in a higher mechanical strength.

It has also been found in in-house experiments that the porosity of the composite particles by the thermal treatment in step (a3) of the process of the invention at a temperature in the range from 900 to 980° C. is also time-dependent in the sense that a longer thermal treatment within the temperature range specified results in a lower porosity.

The possibility of producing, even at comparatively low temperatures in the range from 900 to 980° C., composite particles of excellent suitability for insulating products for the refractory industry or for insulating materials as intermediates for production of such insulating products is a further particular advantage of the process of the invention. Existing processes for producing similar insulating products or intermediates for the refractory industry generally work with much higher temperatures, with a resultant higher energy consumption.

By a suitable choice of temperature or time in step (a3) of the process of the invention, it is therefore possible to produce composite particles having desired values of grain strength and surface porosity.

Examples of a clay or clay-containing rock for use as a precursor here are kaolin and bentonite. It is a particular achievement of the present application to recognize that particular precursor materials (kaolins, e.g. "Chinafill 100" or "Kaolin TEC" from Amberger Kaolinwerke and "Karlicher Blautonmehl" from Karlicher Ton- and Schamottewerke Mannheim & Co. KG, "Satintone W" from BASF AG) on thermal treatment in step (a3), even at comparatively low temperatures, are transformed to another phase of exceptional thermal stability and hence contribute to even better thermal stability of the composite particles produced in processes of the invention. When kaolin is used as precursor in step (a3) of the process of the invention, the hardened droplet is preferably heated to a temperature in the range from 900 to 980° C., such that, for example, kaolinite is transformed through intermediate phases to the refractory solid mullite, which has very high thermal stability.

The use of precursors of refractory solids, especially the use of preferred precursors of refractory solids as described above, like the direct use of refractory solids, contributes to elevated thermal stability of the composite particles produced in accordance with the invention.

Particular preference is given to a process as described above (especially a process described above or hereinafter as preferred), preferably without exceedance of a temperature of 1000° C. in the thermal treatment.

In the construction of reactors that exceed treatment temperatures of 1000° C., special technical measures are necessary. Therefore, a thermal treatment at 980° C. or less contributes to lowering of the reactor complexity and has a much lower energy requirement.

The thermal stability of the composite particles produced in accordance with the invention is especially surprising when compared with the thermal stability of the standard hollow spherical corundum material. For the production of hollow spherical corundum, a melt of aluminum oxide is usually produced and then blown. In order to produce an aluminum oxide melt, temperatures in the region of about 2000° C. are regularly necessary in accordance with the melting temperature of $Al_2O_3$. According to EP1832560 for example, ceramic or vitreous hollow microspheres are produced within temperature ranges of 1000-2000° C. Composite particles produced in accordance with the invention using suitable precursors, even after treatment at lower temperatures (sintering/heat treatment, see above), have elevated thermal stability. Preference is given to a process as described above (especially a process described above or hereinafter as preferred) wherein the hardened droplets are washed in step (a3) and the resulting washed droplets are preferably dried. After the washing (and optionally drying), further treatment steps are then conducted, preferably treatment steps as described above or hereinafter as preferred. Preferably, as a further treatment step, a thermal treatment of the washed and optionally dried droplets is conducted at a temperature below 1000° C.

The composite particles produced in step (a) are preferably free-flowing.

Preference is given to a process as described above (especially a process described above or hereinafter as preferred) wherein the hardened droplets are treated in step (a3), so as to result in solid particles as intermediate, and wherein the surface of these solid particles is subsequently sealed, preferably by means of an organic coating composition or a silicon-containing binder, so as to result in said composite particles. In the individual case, the use of a different inorganic coating composition is advantageous.

In the production of insulating products for the refractory industry or an insulating material as intermediate for the purpose, by the process of the invention and hence using composite particles produced in the inventive manner, a high porosity of said composite particles is observed in many cases. If the aforementioned products or intermediates are processed further using binders, a high porosity may result in an elevated consumption of binders. This is undesirable especially when organic binders are used, since this can lead to elevated costs and to incorporation of further materials that are not otherwise required and in the worst case are harmful (for instance harmful to health). In order to reduce the binder consumption, it is therefore often advantageous to seal the surface or superficial pores of said composite particles.

A particularly preferred organic coating composition is egg white, which is preferably applied in the form of an aqueous solution.

An aqueous egg white solution is preferably produced by mixing an egg white powder with water. Corresponding egg white solutions are produced, for example, with:
- standard egg white powder (product number 150061) from NOVENTUM Foods,
- high-whip egg white powder (product number 150062) from NOVENTUM Foods, and
- high-gel egg white powder (product number 150063) from NOVENTUM Foods.

Particularly preferred nonorganic coating compositions are silicon-containing binders, preferably alkoxysilanes ("silanes") and/or alkoxysiloxane ("siloxane") mixtures, especially the SILRES® BS 3003 product from Wacker Silicones. Nonorganic coating compositions such as the preferred alkoxysilanes and alkoxysiloxane mixtures have the advantage of being water-repellent and heat-resistant.

Since said composite particles, as described above, have high porosity in some cases, it is particularly advantageous to seal these with one of the preferred coating compositions. The preferred coating compositions as described above are directly available on the market, nontoxic and easily processible.

Egg white is particularly preferred as an organic coating composition since it gives excellent sealing of the surface of the composite particles and hence reduces their ability to absorb binder in an advantageous manner.

Preference is given to a process as described above (especially a process described above or hereinafter as preferred) comprising, as an additional step or as additional steps:
(b) mixing the composite particles produced in step (a) with a binder comprising a binder component selected from the group consisting of
alumina cements,
calcium aluminate cements,
monoaluminum phosphate or solution of monoaluminum phosphate,
monomagnesium phosphate or solution of monomagnesium phosphate,
phosphoric acid,
inorganic phosphate,
boron compounds, preferably boron oxide,
magnesium sulfate or solution of magnesium sulfate,
silica sol,
sols of aluminum oxide,
plastic clays,
hydratable aluminum oxide binder,
ethyl silicate,
aluminum sulfate,
preferably
(b) mixing the composite particles produced in step (a) with a binder comprising a binder component selected from the group consisting of
alumina cements,
calcium aluminate cements,
monoaluminum phosphate or solution of monoaluminum phosphate,
monomagnesium phosphate or solution of monomagnesium phosphate,
phosphoric acid,
inorganic phosphate,
boron compounds, preferably boron oxide,
magnesium sulfate or solution of magnesium sulfate,
silica sol,
sols of aluminum oxide,
and optionally, in step (b) or in a further step after step (a), mixing with one or more further substances to produce a curable refractory composition,
and optionally curing the curable refractory composition and/or
(c) producing the insulating product for the refractory industry or the insulating material as intermediate for production of such a product using the composite particles from step (a),
wherein step (c) is preferably performed after step (a) and/or after step (b), and/or
preferably wherein the insulating product for the refractory industry or the insulating material as intermediate for production of such a product is selected from the group consisting of shaped and unshaped refractory and highly refractory products, preferably non-basic refractory materials, and is more preferably selected from the group consisting of
high-alumina bricks,
fireclay bricks,
refractory concretes,
repair compounds,
leveling compounds in the form of pouring, casting, ramming, spraying and vibrating compounds,
mortars and adhesives,
crucibles,
ladle linings,
casting launders,
stopper compounds,
immersion nozzles,
slide gates,
feed nozzles for metallurgy,
pouring compounds, preferably nozzle bricks and plugs, and
furnace linings.

An above-specified "silica sol" has the meaning customary in the specialist field of an aqueous (i.e. water-containing) solution of nearly spherical, colloidally dissolved polysilica molecules having a content in the range from 30% by weight to 60% by weight (based on the total mass of the aqueous solution) of silicon dioxide. According to the particle size of the particles, silica sol is milky and cloudy to colorless and clear; the average particle diameter is 5-150 nm. It is produced by treating an aqueous alkali metal silicate solution ("waterglass").

The above-specified binders or binder components have been found to be suitable for production of curable refractory compositions intended for use in products for the refractory industry.

It is possible to mix the composite particles produced by the above-specified process of the invention or a process of the invention specified as preferred, step (a), with a binder or with a mixture of multiple binders. Such a binder may comprise one or more of the aforementioned binder components, for instance a mixture of multiple binder components of this kind.

Preference is also given to a process as described above (especially a process described above or hereinafter as preferred), wherein the resultant composite particles in step (a3) are characterized by (A) thermal stability at a temperature of 1600° C. or higher, determined by the sintering test (see below for method of determination), and/or (B) a thermal conductivity value at room temperature (20° C.) $\lambda R$ of $\leq 0.26$ W/m*K, preferably $\leq 0.10$ W/m*K, more preferably $\leq 0.07$ W/m*K, and/or (C) a grain strength 1.5 N/mm$^2$, preferably $\geq 2.0$ N/mm$^2$, more preferably $\geq 3.0$ N/mm$^2$, determined to DIN EN 13055-1:2008-08, Annex A (Method 1, agitating for 2*30 s with amplitude 0.5), at a grain size (see below for method of determination) in the range of 0.25-0.5 mm, and/or (D) a bulk density $\leq 750$ g/L, preferably $\leq 500$ g/L, more preferably $\leq 350$ g/L, and/or (E) a grain size of not more than 5 mm, preferably not more than 2 mm, more preferably not more than 1 mm, determined by sieving, (F) a water absorption capacity, determined via water absorption according to Enslin, of $\leq 4.5$, preferably $\leq 3.5$ and more preferably $\leq 2.0$ mL/g.

In the context of the present invention, the "thermal conductivity value" (see point "(B)" below inter alia) is determined in accordance with standard DIN EN 12667:2001-05, "Thermal performance of building materials and products—Determination of thermal resistance by means of guarded hot plate and heat flow meter methods—Products of high and medium thermal resistance".

In the context of the present invention, "bulk density" (see point "(D)" above, inter alia) is determined to DIN EN ISO 60 2000-1.

In the context of the present invention, the "grain size" of the composite particles (see point "(E)" above, inter alia) is determined by means of sieving to DIN 66165-2 (4.1987) using Method F specified therein (machine sieving with moving individual sieve or sieve set in gaseous static fluid). A vibratory sieving machine of the RETSCH AS 200 control type is used; the amplitude is set here to level 2; there is no interval sieving; the sieving time is 1 minute.

In the context of the present invention, "water absorption capacity" (see point "(F)" above, inter alia) is determined by the Enslin method. The method is known to those skilled in the art. It makes use of what is called the "Enslin apparatus" in which a glass suction filter is connected to a graduated pipette via a hose. The pipette is mounted horizontally such that it lies at exactly the same height as the glass frit. A water absorption of 1.5 mL/g thus corresponds to a water absorption of 1.5 mL of water per 1 g of composite particles. The evaluation is to DIN 18132:2012-04.

The invention also relates to the use of a matrix encapsulation method, preferably using a nozzle, more preferably using a vibrating nozzle, for production of composite particles having a bulk density of <750 g/L, preferably <500 g/L, more preferably <350 g/L, in the production of an insulating product for the refractory industry that comprises a multitude of composite particles bonded to one another by a phase that acts as a binder.

This aspect of the invention is based on the surprising finding that the use of composite particles prepared in such a way with a bulk density of <750 g/L, preferably <500 g/L, more preferably <350 g/L, results in very lightweight materials having good insulation and having preferably high thermal stability. With regard to preferred configurations of such a use, the elucidations given for the process of the invention are correspondingly applicable.

For avoidance of misunderstandings, it should be pointed out that feeder elements for the foundry industry are not considered by the person skilled in the art to be products for the refractory industry. Feeder elements for the foundry industry are not part of the present invention and are not regarded as products for the refractory industry. The term "feeder element" in the context of the present documents includes both feeder casings, feeder inserts and feeder caps and heating pads.

Typical products for the refractory industry for the production of which the composite particles produced by the process of the invention or an insulating material comprising these are suitable—especially owing to their high grain strength with simultaneously low bulk density—are shaped and unshaped refractory and/or high-refractory—preferably refractory—products, especially all nonbasic refractory materials. Preferred examples of such shaped or unshaped refractory and/or high-refractory products for the refractory industry are selected from the group consisting of:

high-alumina bricks,
fireclay bricks,
refractory concretes,
repair compounds,
leveling compounds, preferably pouring, casting, ramming, spraying and vibrating compounds,
mortars and adhesives,
crucibles,
ladle linings,
casting launders,
stopper compounds,
immersion nozzles,
slide gates,
feed nozzles for metallurgy,
pouring compounds, preferably nozzle bricks and plugs, and
furnace linings.

The elucidations given for the process of the invention are applicable correspondingly with regard to preferred configurations of an inventive use of a matrix encapsulation process, and vice versa.

The present invention also relates to an insulating product for the refractory industry or to an insulating material as intermediate for production of such a product, comprising a number of refractory composite particles, wherein these composite particles comprise particles of one or more refractory substances and
nanoparticulate silicon dioxide that functions as binder or binder component for said particles of the refractory substances and wherein the product or intermediate is producible by an above-specified process of the invention or preferred process of the invention and/or wherein the composite particles present in the product or intermediate are characterized by
- (A) thermal stability at a temperature of 1600° C. or higher, determined by the sintering test (see below for method of determination), and/or
- (B) a thermal conductivity value at room temperature (20° C.) λR of ≤0.26 W/m*K, preferably ≤0.10 W/m*K, more preferably ≤0.07 W/m*K (see above for method of determination).

Since the above-specified "nanoparticulate silicon dioxide that functions as binder or binder component for said particles of the refractory substances" is produced from the colloidal silicon dioxide specified above in connection with the process of the invention, it is correspondingly the case here that the silicon dioxide particles are in the form of nanoparticulate silicon dioxide provided that the sintering temperature chosen in step (a3) is not at such a high level that the silicon dioxide nanoparticles are sintered or fused completely to one another with loss of the particle shape. The detection of the presence of silicon dioxide in the nanoparticulate form can be conducted by means of scanning electron microscopy ("SEM") or transmission electron microscopy ("TEM").

The elucidations given in respect of the process of the invention and in respect of the inventive use of a matrix encapsulation process are correspondingly applicable with regard to preferred configurations of the insulating product of the invention for the refractory industry or of the insulation material as intermediate for production of such a product, and vice versa.

Preference is given to an insulating product for the refractory industry or an insulating material as intermediate for production of such a product, wherein the composite particles present in the product or intermediate are characterized by
- (C) a grain strength ≥1.5 N/mm², preferably ≥2.0 N/mm², more preferably ≥3.0 N/mm², determined to EN 13055-1, Annex A, Method 1, at a grain size in the range of 0.25-0.5 mm, and/or
- (D) a bulk density ≤750 g/L, preferably ≤500 g/L, more preferably ≤350 g/L, and/or
- (E) a grain size of not more than 5 mm, preferably not more than 2 mm, more preferably not more than 1 mm, determined by sieving, and/or
- (F) a water absorption capacity, determined via water absorption according to Enslin, of ≤4.5, preferably ≤3.5 and more preferably ≤2.0 mL/g.

Preference is also further given to an insulating product of the invention for the refractory industry or an insulating material as intermediate for production of such a product (especially an insulating product or an insulating material described above or hereinafter as preferred), comprising the curing product of a binder component selected from the group consisting of:

alumina cements,
calcium aluminate cements,
monoaluminum phosphate or solution of monoaluminum phosphate,
monomagnesium phosphate or solution of monomagnesium phosphate,
phosphoric acid,
inorganic phosphate,
boron compounds, preferably boron oxide,
magnesium sulfate or solution of magnesium sulfate,
silica sol,
sols of aluminum oxide,
plastic clays,
hydratable aluminum oxide binder,
ethyl silicate and
aluminum sulfate.

Preference is also likewise given to an insulating product of the invention for the refractory industry or an insulating material as intermediate for production of such a product (especially an insulating product or an insulating material described above or hereinafter as preferred), additionally comprising one or more substances selected from the group consisting of:

fireclay, lightweight fireclay, corundum, hollow spherical corundum, sintered corundum, fused corundum, sintered mullite, fused mullite, aluminum oxide (alumina), andalusite, kyanite, sillimanite, cordierite, clays, wollastonite, zirconium mullite, zirconium corundum, spheres of fly ash and vermiculite.

The invention also relates to a (second) process (of the invention) for producing an insulating product for the refractory industry or an insulating material as intermediate for producing such a product, having the following steps:
- (a) producing composite particles having a grain size of less than 5 mm, preferably less than 2 mm, determined by sieving, in a matrix encapsulation process having the following steps:
  - (a1) producing droplets of a suspension composed of at least the following starting materials:
    as dispersed phases
    - (i) one or more refractory substances selected from the group consisting of refractory solids and precursors of refractory solids,
    - (ii) additionally one or more density-reducing substances selected from the group consisting of
    lightweight fillers having a respective bulk density in the range from 10 to 350 g/L and pyrolyzable fillers,
    and as continuous phase
    - (iv) a solidifiable liquid,
  - (a2) solidifying the solidifiable liquid, such that the droplets harden to give hardened droplets and the refractory substance(s) and the density-reducing substance(s) are encapsulated in the solidifying continuous phase,
  - (a3) treating the hardened droplets so as to result in said composite particles, the treating comprising a thermal treatment,
- (b) mixing the composite particles produced in step (a3) with a binder comprising a binder component selected from the group consisting of
alumina cements,
calcium aluminate cements,
monoaluminum phosphate or solution of monoaluminum phosphate,
monomagnesium phosphate or solution of monomagnesium phosphate,
phosphoric acid,
inorganic phosphate,
boron compounds, preferably boron oxide,
magnesium sulfate or solution of magnesium sulfate,
silica sol,
sols of aluminum oxide,
plastic clays,
hydratable aluminum oxide binder,
ethyl silicate,
aluminum sulfate, and optionally, in step (b) or in a further step after step (a), mixing with one or more further substances to produce a curable refractory composition,
and optionally curing the curable refractory composition.

All statements made above in respect of the first process of the invention disclosed in this text (including the process(es) or process variants described above as preferred), especially with regard to definitions, preferred configurations, possible and preferred combinations, more specific descriptions and employable methods of determining parameters, are applicable correspondingly and/or similarly to the second process of the invention with regard to its preferred variants or embodiments cited below, unless stated otherwise, and especially to particularly preferred processes in which all features of the first process of the invention and of the second process of the invention are combined.

Preference is given to a second process of the invention as described above, wherein
in step (a1) droplets are provided by means of one or more nozzles, preferably vibration nozzles, and/or
in step (a2) the solidifying of the solidifiable liquid is induced by cooling, drying or chemical reaction.

Likewise preferred is a second process of the invention as described above (especially such a process described above or hereinafter as preferred) wherein the solidifiable liquid used in step (a1) is a liquid solidifiable by chemical reaction and the solidifying of the solidifiable liquid in step (a2) is induced by chemical reaction.

Further preferred is a second process of the invention as described above (especially such a process described above or hereinafter as preferred) wherein the solidifiable liquid used in step (a1) is a liquid solidifiable by cation exchange reaction, preferably a liquid solidifiable by reaction with calcium ions and/or barium ions and/or manganese ions, preferably by reaction with calcium ions.

Also preferred is a second process of the invention as described above (especially a process described above or hereinafter as preferred), comprising, as an additional step,
(c) producing the insulating product for the refractory industry or the insulating material as intermediate for production of such a product using the composite particles from step (a) and/or the curable refractory composition or the cured refractory composition from step (b),
wherein step (c) is preferably performed after step (a) and/or after step (b),
and/or
preferably wherein the insulating product for the refractory industry or the insulating material as intermediate for production of such a product is selected from the group consisting of shaped and unshaped refractory and highly refractory products, and is more preferably selected from the group consisting of:
refractory bricks,
insulating bricks,
lightweight refractory materials,
insulating compounds including bulk materials, casting compounds, ramming compounds, spraying compounds and vibrating compounds,
ceiling tiles and ceiling elements for suspended ceilings, preferably for movable ceiling constructions and arch constructions in furnace and plant construction,
heat hoods,
crucibles and
ladle linings.

In many cases, preference is also given to a second process of the invention as described above (especially such a process described above or hereinafter as preferred) wherein the solidifiable liquid is a liquid solidifiable by reaction with calcium ions,
comprising one or more binders selected from the group consisting of alginate, polyvinyl alcohol (PVA), chitosan and sulfoxyethyl cellulose,
and/or
an aqueous solution,
wherein the solidifiable liquid is preferably an aqueous alginate solution.

Preference is also given to a second process of the invention as described above (especially such a process described above or hereinafter as preferred) wherein the or at least one of the lightweight fillers used in step (a) as density-reducing substance of component (ii), preferably having a grain size of less than 0.8 mm, more preferably less than 0.5 mm, most preferably less than 0.3 mm, determined by sieving, is selected from the group consisting of:
inorganic hollow beads, organic hollow beads, particles of porous and/or foamed material, rice husk ash, core-shell particles and calcined kieselguhr
and/or
wherein the or at least one of the pyrolyzable fillers used in step (a) as component (ii) is selected from the group consisting of:
polymer beads
and
styrofoam beads.

Preference is also further given to a second process of the invention as described above (especially such a process described above or hereinafter as preferred) wherein the or at least one of the refractory solids used in step (a1) as refractory substance of component (i) is selected from the group consisting of:
oxides, nitrides and carbides, each comprising one or more elements from the group consisting of Si, Al, Zr, Ti, Mg and Ca,
mixed oxides, mixed carbides and mixed nitrides, each comprising one or more elements from the group consisting of Si, Al, Zr, Ti, Mg and Ca,
wherein the or at least one of the refractory solids used in step (a1) as refractory substance of component (i) is preferably selected from the group consisting of:
aluminum oxide,
zirconium oxide,
titanium dioxide,
silicon dioxide,
magnesium oxide,
calcium oxide,
calcium silicate,
sheet silicates, preferably mica,
aluminum silicates,
magnesium aluminum silicate, preferably cordierite,
silicon carbide,
and
boron nitride
and/or
the precursor or at least one of the precursors of refractory solids used in step (a1) as refractory substance of component (i) is selected from the group consisting of
aluminum hydroxide,
magnesium hydroxide,
sheet silicates, preferably kaolinite, montmorillonite and illite, clays, preferably kaolin and bentonite,
phosphates
and
carbonates.

Preference is also further given to a second process of the invention as described above (especially such a process described above or hereinafter as preferred) wherein
the treating in step (a3) is conducted in such a way that the bulk density of the resulting composite particles is lower than the bulk density of the hardened droplets in the dried state and/or
said composite particles have a bulk density <750 g/L, preferably <500 g/L, more preferably <350 g/L.

Preference is also further given to a second process of the invention as described above (especially such a process described above or hereinafter as preferred) wherein at least some of the resultant composite particles in step (a3) and/or the composite particles used in step (b) have a grain size of less than 5.0 mm, preferably of less than 2.0 mm, determined by sieving.

Preference is also further given to a second process of the invention as described above (especially such a process described above or hereinafter as preferred) wherein
component (i) comprises, as refractory substances, one or more precursors of refractory solids and the treating in step (a3) comprises a thermal treatment in which the precursors are converted to a refractory solid,
preferably wherein the precursor or at least one of the precursors of refractory solids is a clay and the treating in step (a3) comprises a thermal treatment at a temperature in the range from 900 to 980° C., such that the clay is converted to a refractory solid, wherein the clay preferably contains kaolinite and/or illite.

Preference is also further given to a second process of the invention as described above (especially such a process described above or hereinafter as preferred) wherein the hardened droplets are treated in step (a3), so as to result in solid particles as intermediate, and wherein the surface of these solid particles is subsequently sealed, preferably by means of an organic coating composition, so as to result in said composite particles.

Preference is also further given to a second process of the invention as described above (especially such a process described above or hereinafter as preferred) comprising, as step (b), mixing the composite particles produced in step (a) with a binder comprising a binder component selected from the group consisting of
alumina cements,
calcium aluminate cements,
monoaluminum phosphate or solution of monoaluminum phosphate,
monomagnesium phosphate or solution of monomagnesium phosphate,
phosphoric acid,
inorganic phosphate,
boron compounds, preferably boron oxide,
magnesium sulfate or solution of magnesium sulfate,
silica sol and
sols of aluminum oxide.

In many cases, preference is also given to second process of the invention (especially such a process described above or hereinafter as preferred) wherein step (a1) uses, as a further starting material for production of droplets of a suspension and as a dispersed phase,
(iii) colloidal silicon dioxide, preferably anionic colloidal silicon dioxide, in addition to constituents (i) and (ii).

In many cases, preference is also given to a second process of the invention as described above (especially such a process described above or hereinafter as preferred), wherein the resultant composite particles in step (a3) are characterized by
(A) thermal stability at a temperature of 1600° C. or higher, determined by the sintering test (see below for method of determination), and/or
(B) a thermal conductivity value at room temperature (20° C.) $\lambda R$ of $\leq 0.26$ W/m*K, preferably $\leq 0.10$ W/m*K, more preferably $\leq 0.07$ W/m*K (see below for method of determination).
and/or
(C) a grain strength 1.5 N/mm$^2$, preferably $\geq 2.0$ N/mm$^2$, more preferably $\geq 3.0$ N/mm$^2$, determined to DIN EN 13055-1:2008-08, Annex A (Method 1, agitating for 2*30 s with amplitude 0.5), at a grain size (see above for method of determination) in the range of 0.25-0.5 mm, and/or
(D) a bulk density $\leq 750$ g/L, preferably $\leq 500$ g/L, more preferably $\leq 350$ g/L (see above for method of determination), and/or
(E) a grain size of not more than 5 mm, preferably not more than 2 mm, more preferably not more than 1 mm, determined by sieving (see above for method of determination),
(F) a water absorption capacity, determined via water absorption according to Enslin, of $\leq 4.5$, preferably $\leq 3.5$ and more preferably $\leq 2.0$ mL/g (see above for method of determination).

The invention also relates to a second insulating product for the refractory industry or to a second insulating material as intermediate for production of such a product, comprising
a number of refractory composite particles, where said composite particles
particles of one or more refractory substances and
preferably nanoparticulate silicon dioxide that functions as binder or binder component for said particles of the refractory substances
and
the curing product of a binder component selected from the group consisting of:
alumina cements,
calcium aluminate cements,
monoaluminum phosphate or solution of monoaluminum phosphate,
monomagnesium phosphate or solution of monomagnesium phosphate,
phosphoric acid,
inorganic phosphate,
boron compounds, preferably boron oxide,
magnesium sulfate or solution of magnesium sulfate,
silica sol,
sols of aluminum oxide,
plastic clays,
hydratable aluminum oxide binder,
ethyl silicate and
aluminum sulfate,
wherein the product or intermediate is producible by a second process of the invention (especially such a process described above or hereinafter as preferred) and/or
wherein the composite particles present in the product or intermediate are characterized by
(A) thermal stability at a temperature of 1600° C. or higher, determined by the sintering test, and/or
(B) a thermal conductivity value at room temperature (20° C.) $\lambda R$ of $\leq 0.26$ W/m*K, preferably $\leq 0.10$ W/m*K, more preferably $\leq 0.07$ W/m*K, All the statements made above in respect of the (first) insulating product of the invention mentioned in this text for the refractory industry or insulating material as intermediate for production of such a product (including the insulating product(s) or insulating material(s) described above as preferred), especially with regard to definitions, preferred configurations, possible and preferred embodiments, more specific descriptions and employable methods of determining parameters, are applicable correspondingly and/or similarly also to the second insulating product for the refractory industry or second insulating material as intermediate for production of such a product (referred to hereinafter as "second insulating product for the refractory industry or second insulating material as intermediate for production of such a product"), including its preferred variants or embodiments cited below, unless stated otherwise.

Products for the refractory industry for the production of which the composite particles produced by the second process of the invention or an insulating material comprising these are suitable—especially owing to their high fire resistance with simultaneously low bulk density—include shaped and unshaped refractory and/or high-refractory—preferably high-refractory—products, especially all nonbasic refractory materials. Preferred shaped or unshaped refractory and/or high-refractory products for the refractory industry for the production of which the composite particles produced by the second process of the invention or an insulating material comprising these are suitable are selected from the group consisting of:

refractory bricks,
 insulating bricks,
 lightweight refractory materials,
 insulating compounds including bulk materials, casting compounds, ramming compounds, spraying compounds and vibrating compounds,
 ceiling tiles and ceiling elements for suspended ceilings, especially for movable ceiling constructions and arch constructions in furnace and plant construction,
 heat hoods,
 crucibles and
 ladle linings.

Preference is given here to a second insulating product for the refractory industry or second insulating material as intermediate for production of such a (second) product (of the invention), wherein the composite particles present in the second product or second intermediate are characterized by (C) a grain strength ≥1.5 N/mm$^2$, preferably ≥2.0 N/mm$^2$, more preferably ≥3.0 N/mm$^2$, determined to DIN EN 13055-1:2008-08, Annex A (Method 1, agitating for 2*30 s with amplitude 0.5), at a grain size (see above for method of determination) in the range of 0.25-0.5 mm,
and/or
(D) a bulk density ≤750 g/L, preferably ≤500 g/L, more preferably ≤350 g/L (see above for method of determination),
and/or
(E) a grain size of not more than 5 mm, preferably not more than 2 mm, more preferably not more than 1 mm, determined by sieving (see above for method of determination),
and/or
(F) a water absorption capacity, determined via water absorption according to Enslin, of ≤4.5, preferably ≤3.5 and more preferably ≤2.0 mL/g (see above for method of determination).

Preference is also further given to a second insulating product for the refractory industry or second insulating material as intermediate for production of such a product (especially such an insulating product or an insulating material described above or hereinafter as preferred), additionally comprising one or more substances selected from the group consisting of:

fireclay, lightweight fireclay, corundum, hollow spherical corundum, sintered corundum, fused corundum, sintered mullite, fused mullite, aluminum oxide (alumina), andalusite, kyanite, sillimanite, cordierite, clays, wollastonite, zirconium mullite, zirconium corundum, spheres of fly ash and vermiculite.

The present invention is elucidated in detail hereinafter with reference to the figures and by examples.

FIGURES

FIG. 1: FIG. 1 shows the residue in the crucible after the sintering test at 1600° C. on the B36 composite particles.

As can be seen in FIG. 1, a small proportion of the composite particles has sintered together, but at the same time there is still a considerable proportion in a pourable form.

Figure 2:
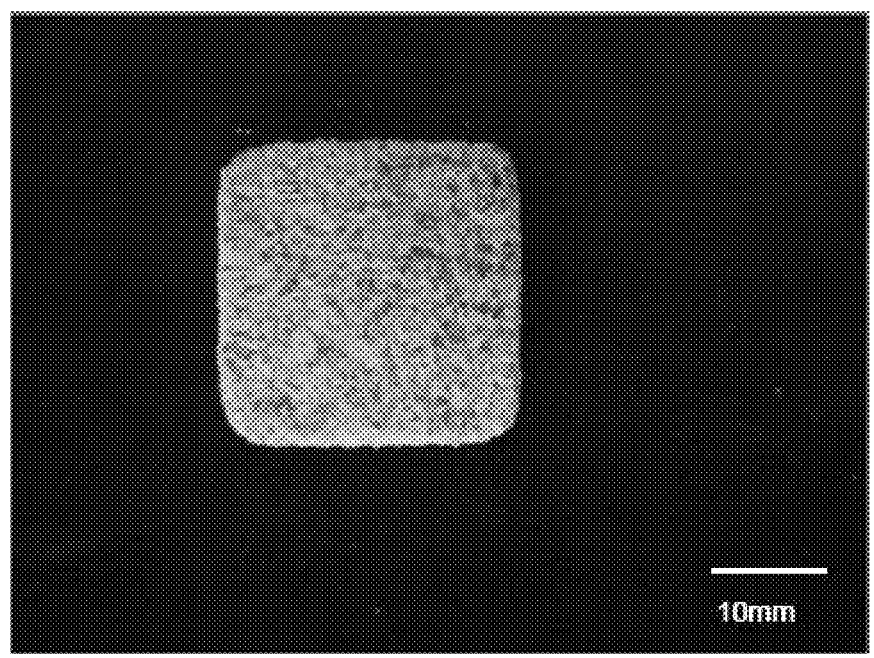

FIG. 2: FIG. 2 shows the crucible residue after the sintering test at 1600° C. on the noninventive W250-6 composite particles.

As can be seen in FIG. 2, the crucible residue has sintered together, forming a coherent "crucible cake".

Figure 3:
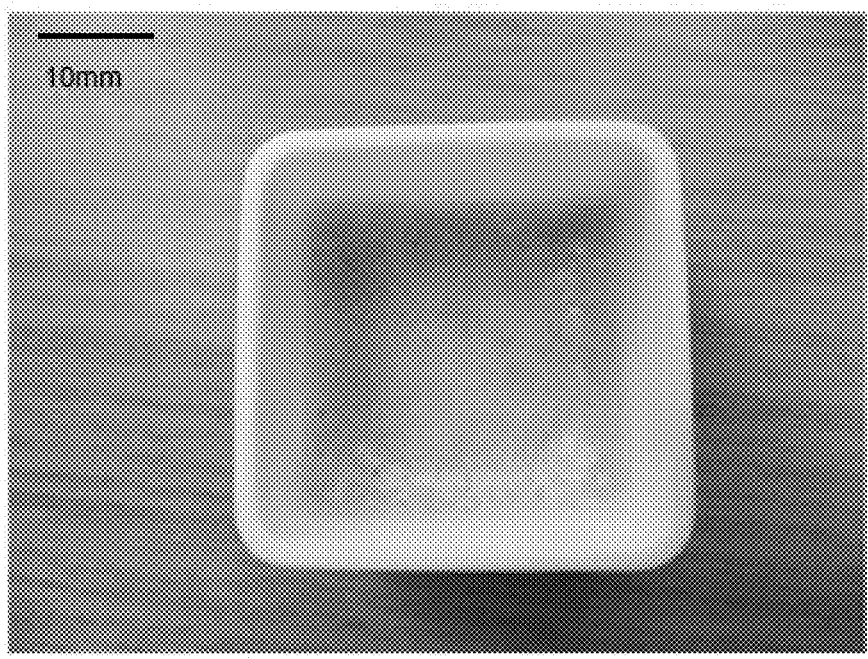

FIG. 3: FIG. 3 shows an image of the crucible contents after the sintering test at 1600° C. on the noninventive KHP 108 composite particles.

As is clearly apparent, the contents of the crucible have fused to give a coherent mass.

Figure 4:
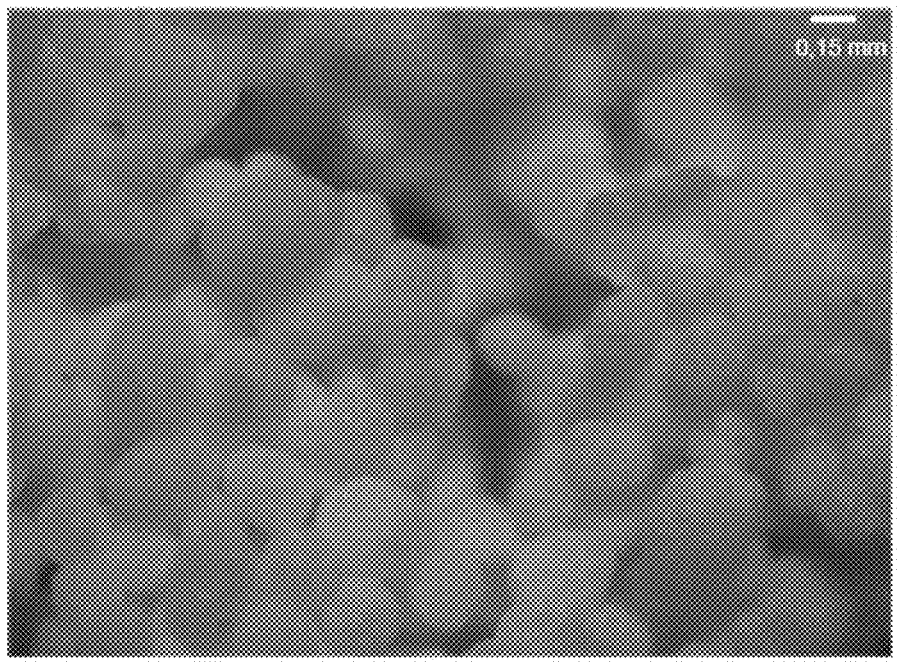

FIG. 4: FIG. 4 shows a microscope image of the B36 composite particles after the sintering test at 1600° C.

As is very well apparent, the composite particles after the sintering test have still not formed any sinter necks.

Figure 5:
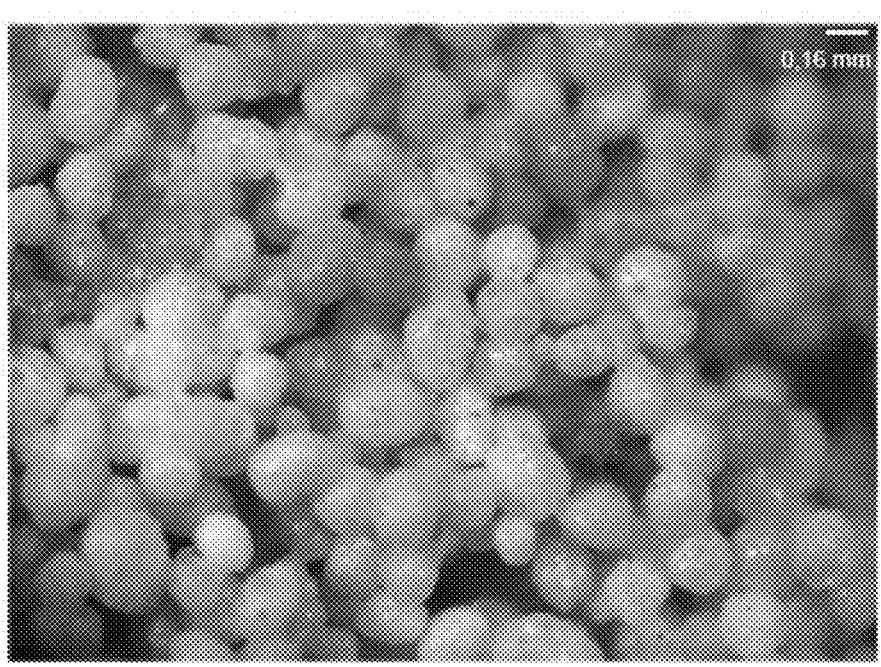

FIG. 5: FIG. 5 shows a microscope image of the noninventive W250-6 composite particles after the sintering test at 1600° C.

It can be seen clearly that sinter necks have formed between the noninventive composite particles and the entirety of the noninventive composite particles has therefore combined to form a coherent "crucible cake".

Figure 6:
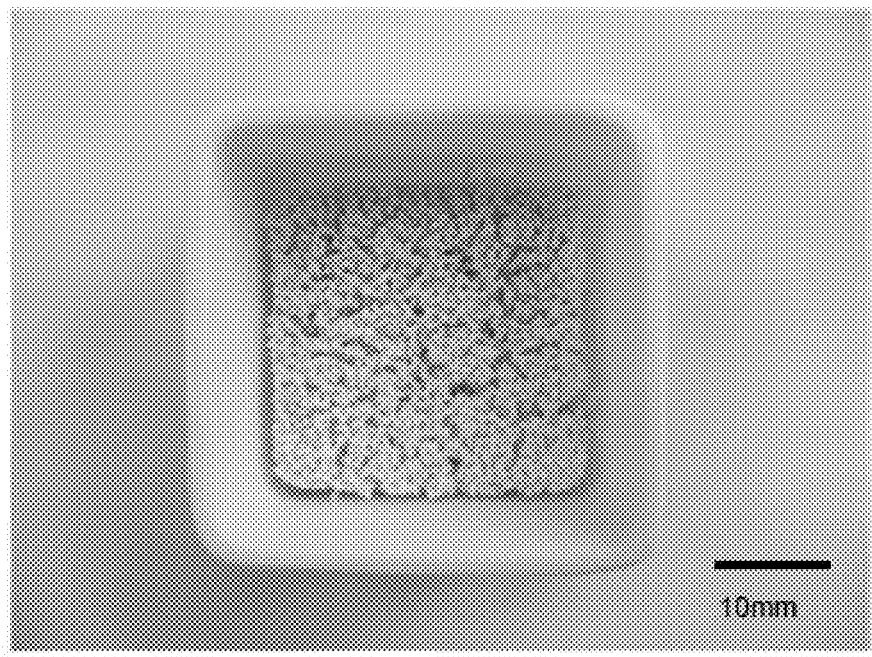

FIG. 6: FIG. 6 shows the residue in the crucible after the sintering test at 1700° C. on the B36 composite particles.

A small proportion of the composite particles has sintered together. However, a considerable proportion is still present in a pourable form.

Figure 7:
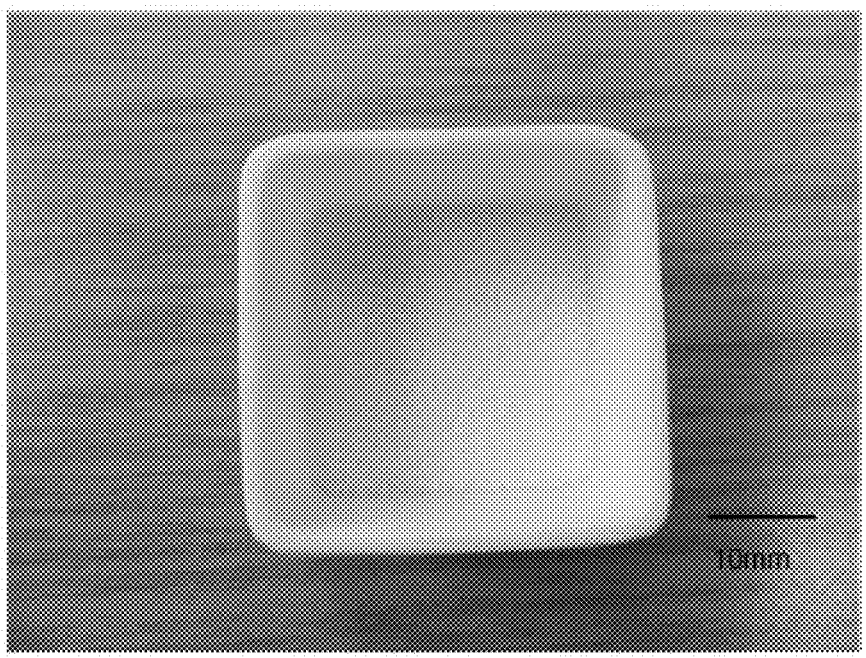

FIG. 7: FIG. 7 shows the crucible residue after the sintering test at 1700° C. on the noninventive "Hargreaves" hollow spherical corundum composite particles.

It can be seen that the entirety of the noninventive composite particles has combined to form a coherent "crucible cake".

Figure 8:
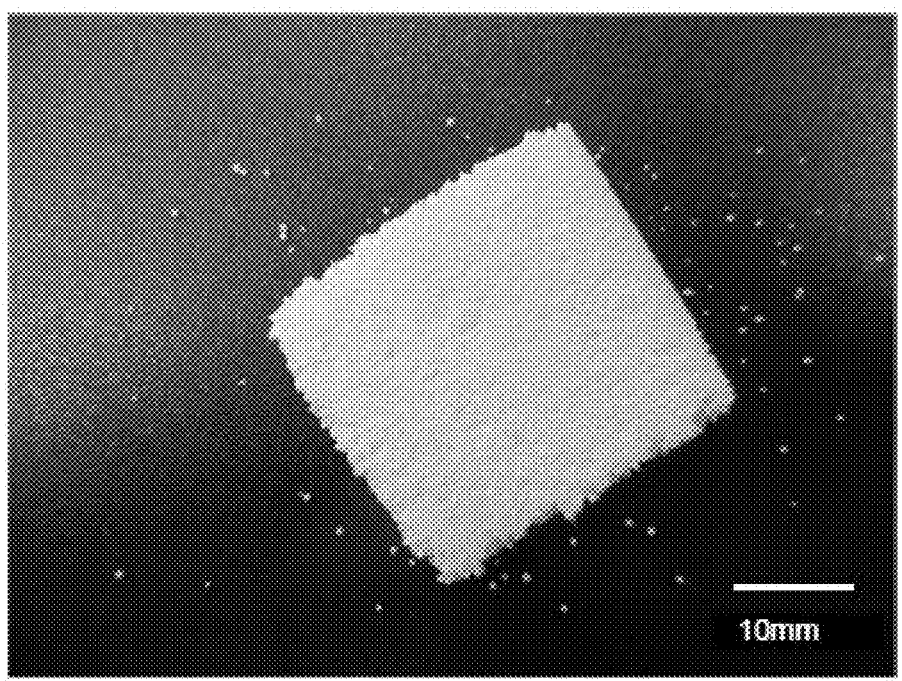

FIG. 8: FIG. 8 shows the crucible residue after the sintering test at 1700° C. on the noninventive "KKW" hollow spherical corundum composite particles.

As is clearly apparent, the entirety of the noninventive composite particles has combined to form a coherent "crucible cake".

Figure 9:
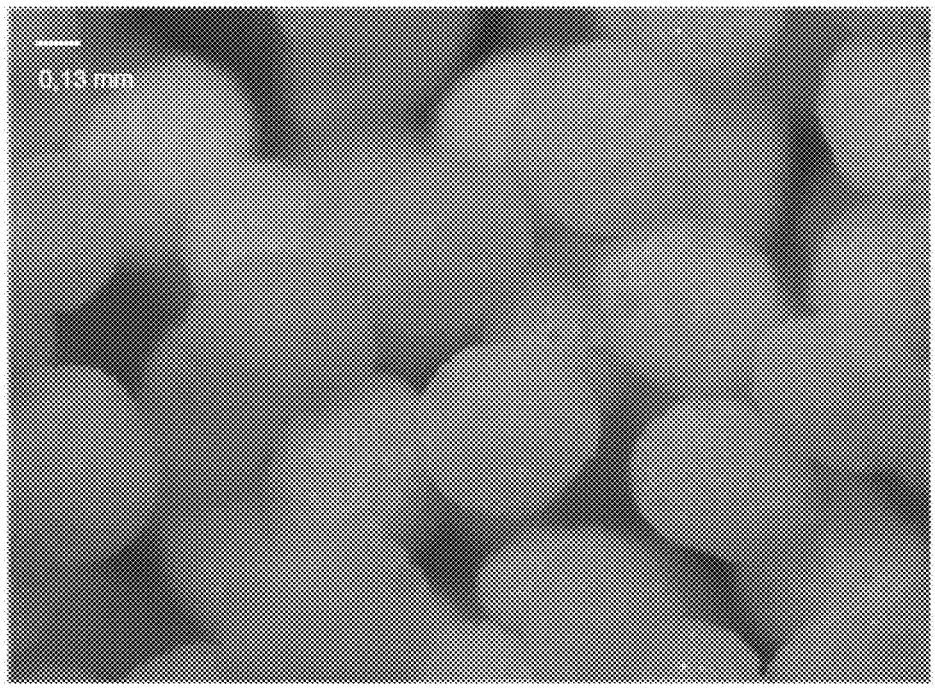

FIG. 9: FIG. 9 shows a microscope image of the B36 composite particles after the sintering test at 1700° C.

As is very well apparent, the composite particles after the sintering test have still not formed any sinter necks.

Figure 10:
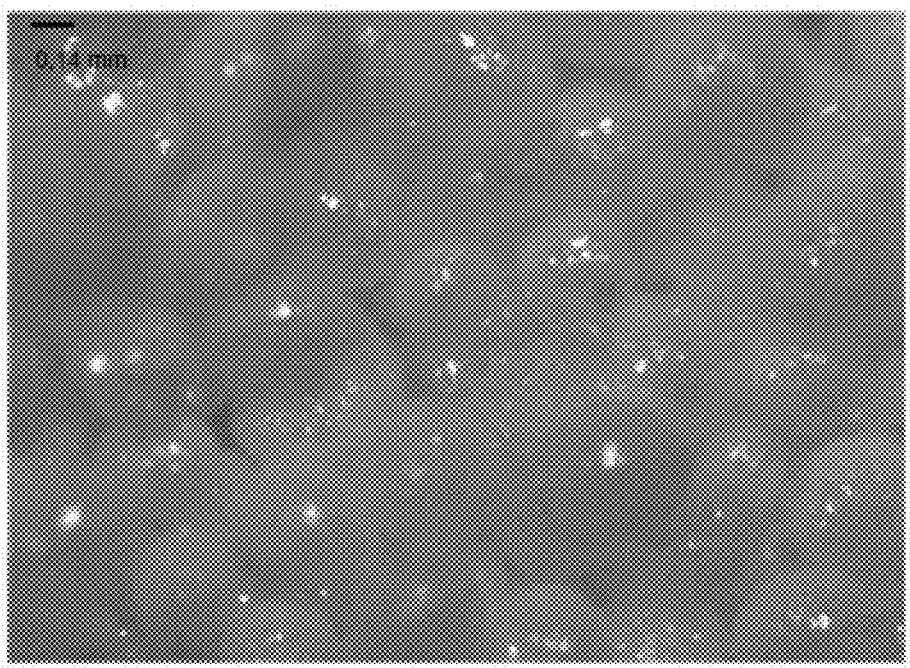

FIG. 10: FIG. 10 shows a microscope image of the noninventive "Hargreaves" hollow spherical corundum composite particles after the sintering test at 1700° C.

The particles have melted superficially during the sintering test, as a result of which all noninventive composite particles have combined on solidification to form a coherent "crucible cake".

Figure 11:
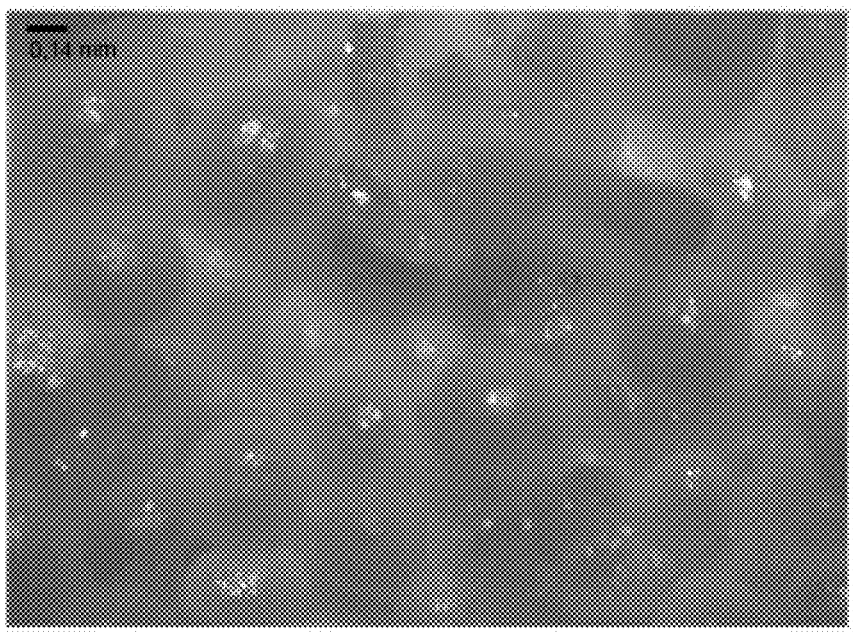

FIG. 11: FIG. 11 shows an enlarged microscope image of FIG. 10 of the noninventive "KKW" hollow spherical corundum composite particles after the sintering test at 1700° C.

The particles have melted superficially during the sintering test, as a result of which all noninventive composite particles have combined on solidification to form a coherent "crucible cake".

Figure 12:
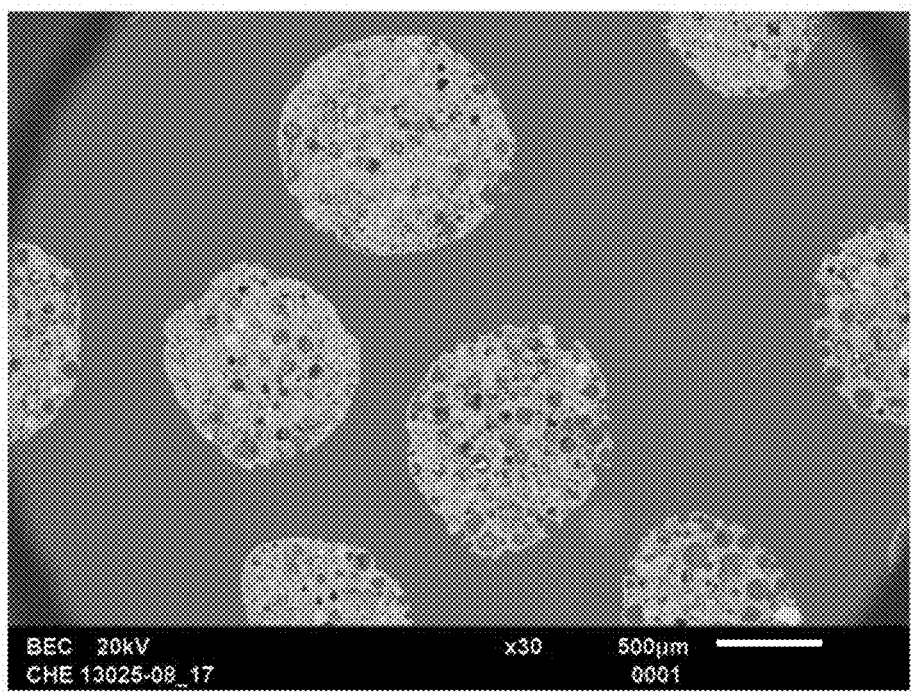

FIG. 12: In FIG. 12 is a scanning electron micrograph of the composite particles designated "B36" (see examples further down in the text).

Figure 13:
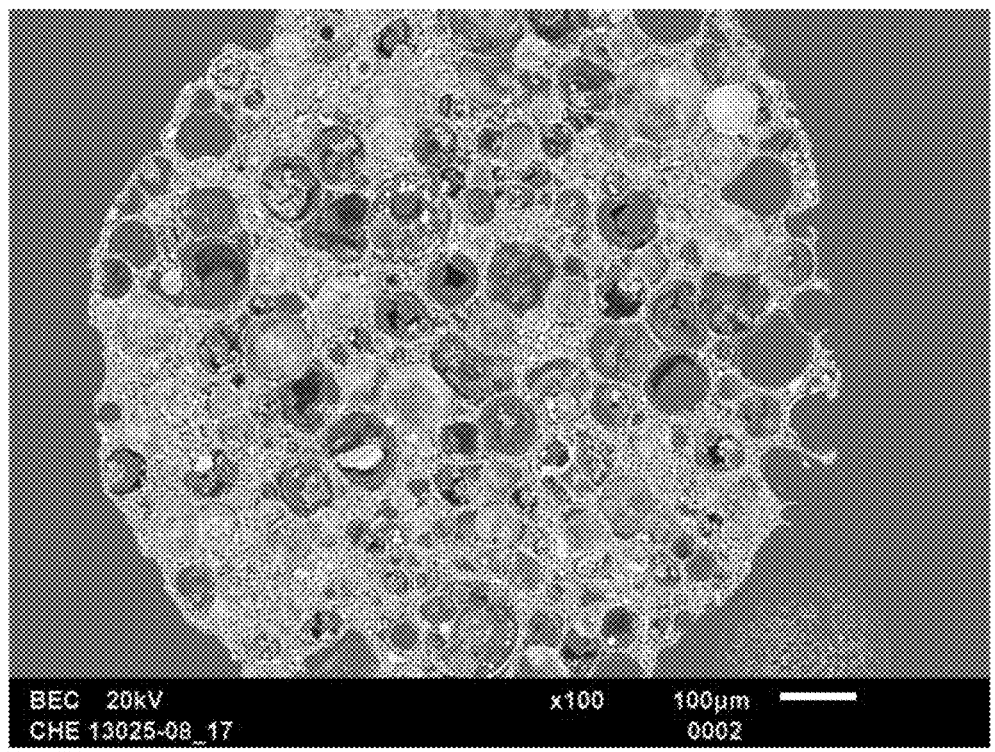

FIG. 13: FIG. 13 shows an enlarged scanning electron micrograph of the composite particles designated "B36" (see examples further down in the text).

It can be seen very readily that the different refractory solids are individually surrounded by the continuous phase and hence are held together more securely, as a result of which the composite particles produced in accordance with the invention attain the desired dimensional stability and desired thermal stability.

Figure 14:
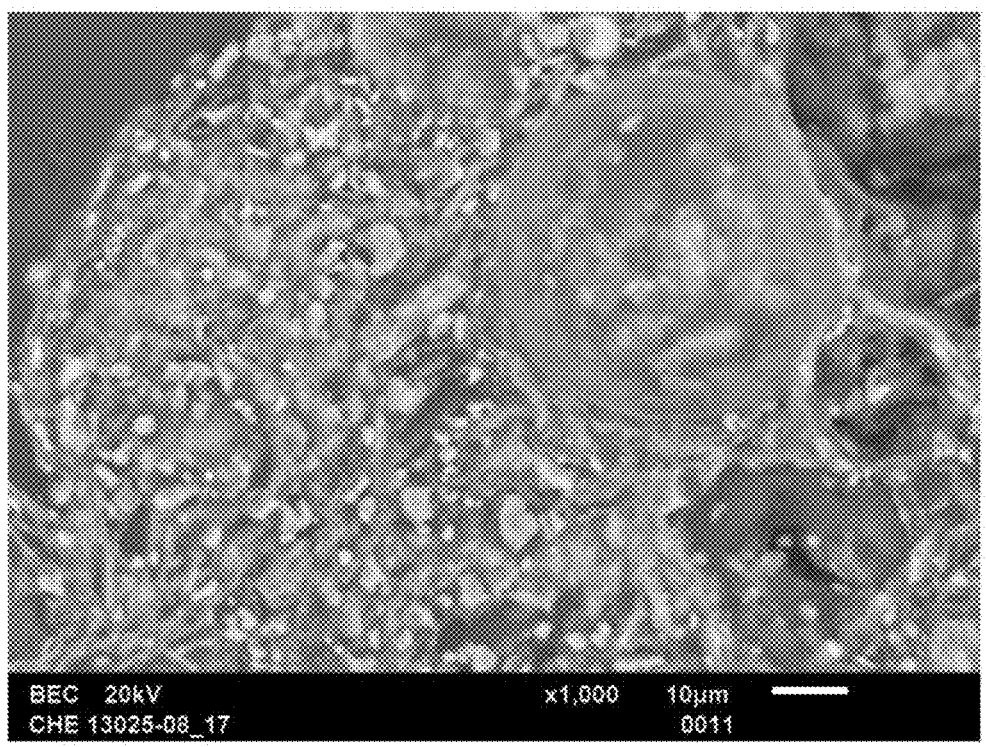

FIG. 14: FIG. 14 shows a highly enlarged scanning electron micrograph of the "B36" composite particles.

Figure 15:
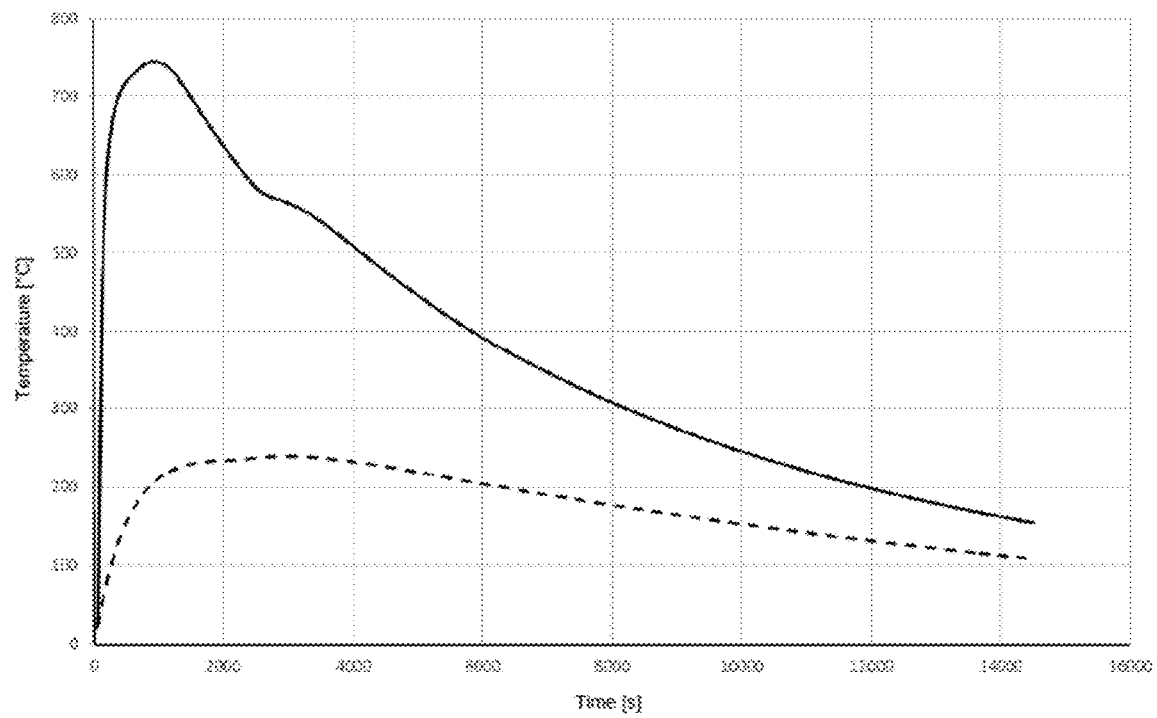

FIG. 15: FIG. 15 shows the temperature in each case within the insulation materials of examples 4a (second intermediates of the invention, produced by the second process of the invention, lower temperature/time curve (gray)) and 4b (comparative example, upper temperature/time curve (black)), and of the crucibles produced from the respective second insulation materials, as a function of time after the casting operation.

It is readily apparent that a distinctly smaller (by about 30%) temperature rise is recorded in the insulation material 4a (see below for details), which indicates a distinctly lower thermal conductivity or better insulating effect compared to the noninventive comparative insulation material 4b (see below for details).

Figure 16:
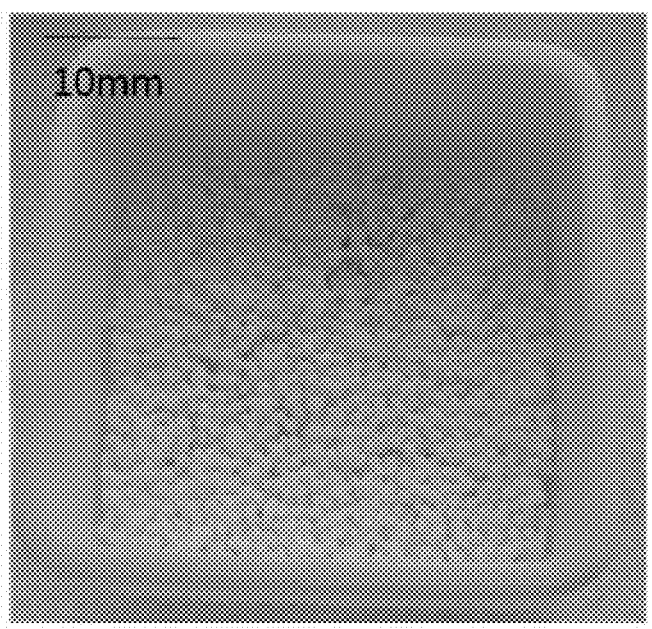

FIG. 16: FIG. 16 shows the residue in the crucible after the sintering test at 1600° C. on the C6 composite particles produced in accordance with the invention.

As can be seen in FIG. 16, only a small proportion of the composite particles has sintered together, but at the same time there is still a considerable proportion in a pourable form.

Figure 17:
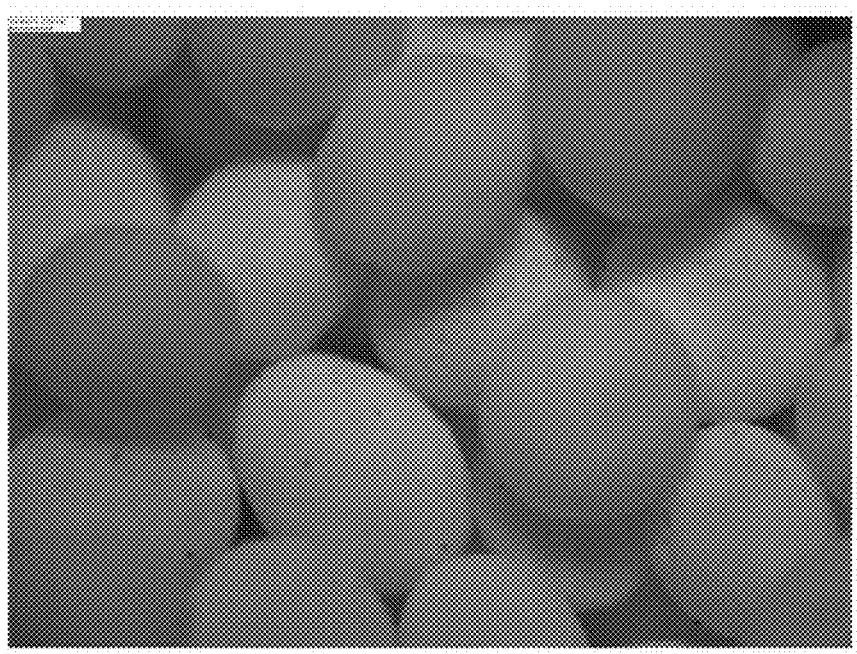

FIG. 17: FIG. 17 shows a microscope image of the C6 composite particles produced in accordance with the invention after the sintering test at 1600° C.

As is very well apparent, the composite particles produced in accordance with the invention after the sintering test have formed only a few sinter necks.

Figure 18:
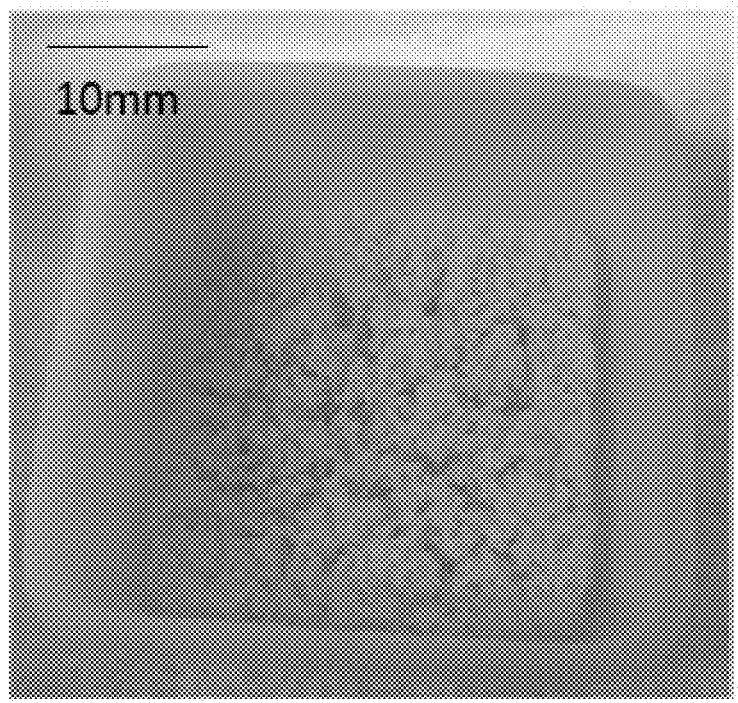

FIG. 18: FIG. 18 shows the crucible residue after the sintering test at 1700° C. on the "C6" composite particles produced in accordance with the invention.

As is readily apparent in FIG. 18, only a small proportion of the composite particles produced in accordance with the invention has sintered together. However, a considerable proportion is still present in a pourable form.

Figure 19:

FIG. 19: FIG. 19 shows a microscope image of the C6 composite particles produced in accordance with the invention after the sintering test at 1700° C.

As is readily apparent in FIG. 19, the composite particles produced in accordance with the invention after the sintering test have formed only a few sinter necks.

The present invention is elucidated in detail hereinafter by examples:

EXAMPLES

Test Methods:
1. Particle Size Determination:

The determination of the grain sizes of composite particles by sieving was effected in accordance with DIN 66165-2 (4.1987) using Method F specified therein (machine sieving with moving individual sieve or sieve set in gaseous static fluid). A vibratory sieving machine of the RETSCH AS 200 control type was used; the amplitude was set here to level 2; there was no interval sieving; the sieving time was 1 minute.

The determination of the grain sizes of lightweight fillers used in step (a) as density-reducing substance of component (ii) was likewise effected in accordance with DIN 66165-2 (4.1987) using Method F specified therein (machine sieving with moving individual sieve or sieve set in gaseous static fluid). A vibratory sieving machine of the RETSCH AS 200 control type was likewise used; the amplitude was set here to level 2; there was no interval sieving; the sieving time was 1 minute.

The determination of the grain sizes of refractory solids having a grain size of less than 0.1 mm was effected by sieving to DIN 66165-2 (4.1987) using Method D specified therein (machine sieving with a static individual sieve in gaseous moving fluid, with air jet sieve).

2. Determination of Bulk Density:

Bulk density was determined to DIN EN ISO 60 2000-1.

3. Determination of Water Absorption Capacity:

The determination of water absorption was conducted with the aid of an Enslin instrument. The evaluation is to DIN 18132:2012-04.

4. Determination of Chemical Composition and Morphology:

The morphology of the samples was conducted with the aid of a JSM 6510 SEM from Jeol.

The chemical composition was conducted with the aid of an EDX analysis using an Oxford INCA EDX.

In addition, the morphology was determined using a VisiScope ZTL 350 light microscope with a Visicam 3.0 camera.

5. Method of Determining Thermal Stability (Sintering Test):

The sintering test in the present invention for determining the thermal stability of various raw materials was conducted in accordance with the VDG [Society of German Foundry Experts] guideline sheet P26 "Prüfung von Formgrundstoffen" [Testing of mold raw materials]. An amount of particles of identical composition that was to be tested was subjected to a defined thermal treatment (for example 1600° C. or 1700° C. for a half hour in each case) in a Carbolite HTF 1800 furnace with an E 3216 type temperature regulator and then assessed by sieving by means of a defined mechanical stress.

Firstly, sieving of the amount of particles to be examined with a sieve of mesh size 0.5 mm (see table 2 below) or of 0.71 mm (see table 3 below) was conducted in order to ensure reproducibility and comparability of the different experiments.

Subsequently, the sieved particles were subjected to a defined thermal treatment with the following steps in an aluminum oxide crucible:

"pre-sintering" of the samples, at 900° C. in a preheated furnace for 30 min, in order to assure identical thermal stress on the comparative samples to the composite particles of the invention, heat treatment of the samples with a defined furnace cycle (Carbolite HTF 1800 furnace with E3216 type temperature regulator): from 25° C. to 200° C. at 1 K/min, then up to the final temperature (1600° C. over a half hour (see table 2 below) or 1700° C. over a half-hour (see table 3 below)) at 3 K/min and subsequent cooling to room temperature at 3 K/min.

Thereafter, the cooled particles were photographed with the aluminum oxide crucible (see FIG. 3 (particles melted), FIG. 6 and FIG. 7) or without the aluminum oxide crucible (see FIG. 1, FIG. 2 and FIG. 8) and, if the particles examined had not melted during the defined thermal treatment, the aluminum oxide crucible in which the particles examined were subjected to heat treatment was clamped in a sieving tower and was put under mechanical stress at an amplitude of 2 without interval sieving, i.e. sustained sieving, by defined sieving with a control sieve on a Retsch AS 200 for 1 minute in each case. The mesh size of the control sieve was adjusted to the maximum grain size to be expected in the particles examined (either 0.5 mm (see table 2 below) or 0.71 mm (see table 3 below)). The criterion employed is the ratio of sieve residue to sieve passage (cf. VDG guideline sheet P26 "Prüfung von Formgrundstoffen", October 1999). In the case of a factor of sieve residue/sieve passage of greater than 1, the sample is considered to be sintered and therefore to be thermally unstable.

Sample-specific parameters, for example the grain size of the respective sample, were taken into account in the evaluation.

6. Method of Determining Grain Strength

The grain strength of the samples was determined to DIN EN 13055-1:2008-08, Annex A (Method 1, agitating for 2*30 s with amplitude 0.5), at a grain size in the range of 0.25-0.5 mm.

Example 1

By step (a) of the first process of the invention, composite particles (C6) were produced with a grain size of less than 5 mm (also referred to hereinafter as "composite particles produced in accordance with the invention"), as described hereinbelow. The composition of the suspension used for the purpose is reported below in table 1.

Likewise produced by step (a) of the second process of the invention were composite particles (B36, B361) with a grain size of less than 5 mm, as described hereinbelow. Unless stated otherwise, the composite particles B36 and B361 were produced analogously to the composite particles C6.

(a1) Producing Droplets of a Suspension of Starting Materials:

A 1% aqueous sodium alginate solution was produced (1% by weight of sodium alginate from Alpichem with CAS No. 9005-38-3, based on the total mass of the aqueous solution).

The Sokalan® FTCP 5 dispersant from BASF was diluted with water to prepare a corresponding dispersion solution; the mass ratio of Sokalan® FTCP 5 to water was 1:2.

The 1% aqueous sodium alginate solution prepared and the dispersion solution prepared were subsequently mixed in a mixing ratio according to table 1, so as to give a solidifiable liquid (solidifiable liquid for use as continuous phase in the sense of constituent (iv) in step (a1) of the first process of the invention or in the sense of constituent (iv) in step (a1) of the second process of the invention.

While stirring, precursors of refractory solids and refractory solids selected in accordance with table 1 below (constituent (i) in step (a1)) were added to the solidifiable liquid, as was any colloidal silicon dioxide as a further constituent (constituent (iii) in step (a1), only for composite particles C6), until a creamy suspension was formed.

While stirring, thereafter, borosilicate beads were added to the creamy suspension in an amount corresponding to table 1 below as an example of a lightweight filler (constituent (ii) in step (a1)), followed by an amount of water according to table 1. The result is a diluted suspension.

TABLE 1

Ingredients for inventive production of composite particles (C6) and composite particles by the second process of the invention (B36, B361)

| | | Ingredients | | Composition of the suspension | | |
|---|---|---|---|---|---|---|
| Starting material | | Constituent | Manufacturer | (parts by weight) | | |
| Precursor of refractory substances [% by wt.] | (i) | Kaolin TEC | Amberger Kaolinwerke | 11.00 | 11.00 | — |
| | (i) | Kärlicher Blauton | Kärlicher Ton- und Schamottewerke Mannheim & Co. KG | 5.00 | 5.00 | — |
| | (i) | Kaolin (Satintone ®W (Whitetex)) | BASF | — | — | 20.00 |
| Refractory material [% by wt.] | (i) | Nabalox ® NO315 | Nabaltec AG | 10.85 | 10.85 | 19.85 |
| Lightweight fillers [% by wt.] | (ii) | Borosilicate glass beads (product name: 3M Glass Bubbles K1) Bulk density of 60 g/L | 3M Deutschland GmbH | 3.15 | 3.15 | 3.15 |

TABLE 1-continued

Ingredients for inventive production of composite particles (C6) and composite
particles by the second process of the invention (B36, B361)

| Starting material | | Ingredients | | Composition of the suspension | | |
|---|---|---|---|---|---|---|
| | | Constituent | Manufacturer | (parts by weight) | | |
| Colloidal SiO$_2$ | (iii) | Ludox ® TMA 34% by wt. in water CAS RN 55965-84-9 | W. R. Grace & Co. | — | — | 12.00 |
| 1% sodium alginate solution [% by wt.] | (iv) | Sodium alginate; CAS: 9005-38-3 | Applichem | 65.0 | 68.0 | 55.0 |
| Dispersion solution [% by wt.] | (iv) | Sokalan ® FT CP5 in water (1.2) | BASF | 5.00 | 2.00 | 2.00 |
| Water [% by wt.] | | | | 20.00 | 30.00 | 10.00 |
| Resulting composite particles | | | | B36 | B361 | C6 |
| Bulk density immediately before treatment in muffle furnace [g/L] | | | | 350 | 350 | 410 |
| Bulk density after treatment in muffle furnace [g/L] | | | | 340 | 340 | 390 |
| Water absorption after treatment in muffle furnace [mL/g] | | | | — | 2.5 | 1.7 |
| Grain strength after treatment in muffle furnace (grain size in the range from 0.25 to 0.5 mm) [N/mm$^2$] | | | | — | 2.1 | 3.2 |

(a2) Solidifying the Solidifiable Liquid

The diluted suspension was introduced into plastic syringes and clamped into an LA-30 syringe pump. The feed rate was 12 to 15 mL/min. The diluted suspension in the syringes was then forced through a vibration nozzle, such that the diluted suspension dripped out of the vibration nozzle in uniform droplets. The droplets that dripped out of the vibration nozzle fell into an about 2% aqueous calcium chloride solution (CaCl$_2$), product name "Calcium Chloride 2-hydrate powder for analysis ACS" from Applichem, CAS No. 10035-04-8, 2% by weight based on the total mass of the calcium chloride solution) and solidified, such that they hardened to give hardened droplets and the refractory substances and the borosilicate glass beads were encapsulated in the solidifying mixture (consisting of the 1% sodium alginate solution and the dispersion solution).

Note: The size of the hardened droplets was dependent on the composition of the diluted suspension, the delivery rate of the pump and the vibration frequency of the nozzle.

(a3) Treating the Hardened Droplets

Subsequently, the hardened droplets were skimmed off and washed in water.

Thereafter, the washed and hardened droplets were dried in a drying cabinet at 180° C. for 40 min. After the drying, the hardened droplets were free-flowing, and the bulk density thereof "immediately prior to treatment in muffle furnace" is reported in table 1.

Thereafter, the free-flowing hardened droplets were heated in a preheated muffle furnace at 950° C. for 30 minutes. After cooling, the result was composite particles produced in accordance with the invention that constitute excellent insulation materials for the refractory industry, preferably insulation materials as intermediates for production of insulating products for the refractory industry.

As can be inferred from the third-from-last line of table 1, the measured bulk densities of the composite particles of the invention produced are below 400 g/L. By a suitable choice of the refractory materials or precursors for refractory materials and the lightweight fillers, it is possible if necessary to further reduce the bulk density of the resulting composite particles produced in accordance with the invention.

As can be inferred from the last line of table 1, the "C6" composite particles produced by the process of the invention have a surprisingly high grain strength. It is assumed that this advantageous high strength is a result of the interaction of the factors of (j-1) thermal treatment at a temperature in the range from 900 to 980° C. in step (a3), (j-2) hardening of the solidifiable liquid, preferably of the alginate, in step (a2), and (j-3) the effect of the colloidal silicon dioxide in step (a1) as a binder. The energy expenditure for achieving a desired high grain strength can therefore be reduced in the thermal treatment in step (a3) of the process of the invention compared to other similar (known) processes.

Example 2: Sintering Tests

Sintering test at 1600° C. to compare the thermal stability of composite particles produced in accordance with the invention and not produced in accordance with the invention In the sintering test described further up, "C6" composite particles produced by the first production process of the invention and "B36" composite particles produced by the second production process of the invention (step (a)) were tested by comparison with "KHP 108" composite particles not produced in accordance with the invention (core-shell particles from Chemex) and "W 205-6" particles not produced in accordance with the invention ("Weisse Spheres W250-6" product from Omega Minerals). The particles produced in accordance with the invention and the particles not produced in accordance with the invention had a grain size in the range from 0.25 to 0.5 mm. The sintering temperature was 1600° C. The control sieve for ascertaining the sieve residue and the sieve passage had a mesh size of 0.5 mm.

The results of the sintering test at 1600° C. are shown in table 2.

TABLE 2

Results of the sintering test at 1600° C. (pre-sintering of the samples, 30 min at 900° C. in the preheated furnace, then sintering temperature of 1600° C. for 30)

|  | "B36" composite particles | "C6" composite particles produced in accordance with the invention | Noninventive "W250-6" composite particles | Noninventive "KHP 108" composite particles |
|---|---|---|---|---|
| Grain size [mm] | 0.25-0.5 | 0.25-0.5 | 0.25-0.5 | 0.25-0.5 |
| Bulk density [g/L] | 340 | 390 | 390 | 540 |
| Result of sieving with 0.5 mm control sieve | Sieve residue/ sieve passage = 0.4 | Sieve residue/ sieve passage = 0.7 | Sieve residue/ sieve passage = 28.4 | completely melted, no sieving possible |
| Macroscopic absorption after sintering | see FIG. 1 | see FIG. 16 | see FIG. 2 | see FIG. 3 |
| Microscopic absorption after sintering | see FIG. 4 | see FIG. 17 | see FIG. 5 | — |
| Result | not sintered | not sintered | sintered | melted |

As can be inferred from table 2, the ratio of sieve residue to sieve passage for the "B36" and "C6" composite particles after the sintering is below 1, whereas this ratio for the composite particles not produced in accordance with the invention after the sintering is above 1. Thus, the thermal stability of the "B36" and "C6" composite particles at 1600° C. is better than that of the noninventive composite particles.

Sintering test at 1700° C. on composite particles produced in accordance with the invention and composite particles not produced in accordance with the invention By the sintering test described further up, "C6" composite particles produced by the first production process of the invention and "B36" composite particles produced by the second process of the invention (step (a)) were tested by comparison with "Hargreaves" composite particles not produced in accordance with the invention (hollow spherical corundum with >98.8% $Al_2O_3$ from "Hargreaves raw material services GmbH") and "KKW" composite particles not produced in accordance with the invention (hollow spherical corundum with >98.8% $Al_2O_3$ from "Imerys Fused Minerals Zschornewitz GmbH"). The grain sizes of the composite particles were always within the defined range from 0.18 to 0.71 mm. The sintering temperature was 1700° C. The control sieve for determining the sieve residue and the sieve passage had a mesh size of 0.71 mm.

The results of the sintering test at 1700° C. are shown in table 3:

TABLE 3

Results of the sintering test at 1700° C. (pre-sintering of the samples, 30 min at 900° C. in the preheated furnace, then sintering temperature of 1700° C. for 30 min)

|  | Composite particles produced in accordance with the invention | Composite particles | Composite particles not produced in accordance with the invention | Composite particles not produced in accordance with the invention |
|---|---|---|---|---|
| Designation of the particles tested | "C6" | "B36" | "Hargreaves" | "KKW" |
| Grain size [mm] | 0.18-0.71 | 0.18-0.71 | 0.18-0.71 | 0.18-0.71 |
| Bulk density [g/L] | 340 | 340 | 980 | 770 |
| Result of sieving with 0.71 mm control sieve | Sieve residue/ sieve passage = 0.9 | Sieve residue/ sieve passage = 0.7 | Sieve residue/ sieve passage > 1* | Sieve residue/ sieve passage > 1* |
| Macroscopic absorption after sintering | see FIG. 18 | see FIG. 6 | see FIG. 7 | see FIG. 8 |
| Microscopic absorption after sintering | see FIG. 19 | see FIG. 9 | see FIG. 10 | see FIG. 11 |
| Result | not sintered | not sintered | sintered | sintered |

*no breakup of the sinter cake by sieving possible

As can be inferred from table 3, the ratio of sieve residue to sieve passage for the "C6" and "B36" composite particles produced in accordance with the invention after the sintering is less than 1, whereas this ratio for the composite particles not produced in accordance with the invention after the sintering is greater than 1. Thus, the thermal stability of the "C6" composite particles produced in accordance with the invention and of the "B36" composite particles at 1700° C. is better than that of the composite particles not produced in accordance with the invention.

Example 3: "Surface Sealing"

The B36 composite particles (cf. table 1), after they had been heated at 900° C. for 30 minutes in a preheated oven, were surface sealed as follows.

The surface sealing was effected with an aqueous egg white solution that contained 6% by weight of high-gel egg white powder (product number 150063) from NOVENTUM Foods, based on the total weight of the resultant aqueous solution.

Subsequently, the B36 composite particles were mixed with the egg white solution produced in a weight ratio of composite particles to egg white solution of 2:1 and stirred in the resultant mixture until the egg white solution was completely absorbed. Subsequently, the composite particles treated with the egg white solution were dried in a drying cabinet at 110° C. for 40 minutes. The resultant composite particles are referred to as B36-egg white.

The finding of the water absorption capacity of B36 (without egg white coating) and B36-egg white (with egg white coating) composite particles with an Enslin instrument showed that the water absorption of the composite particles is reduced by an egg white coating from 1.6 mL/g (B36) to 0.1 mL/g (B36-egg white).

Example 4: Comparison of the Insulating Effect of Insulating Materials

For production of an insulating material as intermediate for production of an insulating product for the refractory industry, "B36" composite particles (production by the second process of the invention, steps (a1) to (a3), see example 1 and tables 1 and 2) were mixed with the further constituents specified below in table 4 (production by the second process of the invention, step (b), see below for details). The result was a second insulating material of the invention for the refractory industry (example 4a).

For comparison, a noninventive refractory insulation material was produced analogously to the above-detailed example 4a, except that there were no "B36" composite particles present and, instead, the proportion of lightweight fireclay ("fine grains") was increased by the corresponding proportion by mass (see table 4, for details see below). The result was a noninventive conventional insulating material for the refractory industry (example 4b).

ISOSAT® 150 is a commercial refractory material having a content of about 57% by weight of $Al_2O_3$ and $TiO_2$ and a content of about 2% by weight of $Fe_2O_3$.

The constituents for production of the insulation materials according to examples 4a (second process of the invention) and 4b (comparative example) were mixed with a Hobart mixer, by premixing all the dry constituents and then adding the water.

The two resultant insulation materials were each cast in the form of a crucible (the crucible with the insulation material 4a is a second insulating product of the invention) and dried at room temperature for 24 h. This was followed in each case by thermal treatment at 900° C. for 10 h (temperature regime: 80 K/h). After drying and thermal treatment, thermocouples (type K) for temperature measurement were each inserted into the two crucibles at identical positions within the insulation materials. Then the two crucibles were cast with iron (gray iron) at a temperature of 1500° C., with measurement and recording of the resultant temperature rise in the insulation material. The data were recorded with a PCE-T 390 digital thermometer (from PCE Deutschland GmbH).

The result of the temperature measurement is shown in the form of a graph in FIG. 15:

FIG. 15 shows the temperature in each case within the insulation materials of examples 4a (relating to a second insulation material of the invention, lower temperature/time curve (gray)) and 4b (comparative example, upper temperature/time curve (black)), and of the crucibles produced from the respective insulation materials, as a function of time after the casting operation ("heat transfer curves" of the insulation materials).

In the second insulation material 4a of the invention, a distinctly smaller (by about 30%) temperature rise than in the insulation material of comparative example 4b was recorded, which indicates a distinctly lower thermal conductivity or a higher insulating effect of the insulation material 4a compared to the noninventive comparative insulation material.

Such a distinctly improved insulation effect in a product for the refractory industry means a distinct saving of energy and costs on the industrial scale.

The invention claimed is:

1. A process for producing an insulating product for the refractory industry or an insulating material as intermediate for producing such a product, having the following steps:

TABLE 4

Production of refractory insulation materials with and without composite particles B36

| Component | Constituent | Example 4a Starting weight [g] | Example 4b (comparison) Starting weight [g] |
|---|---|---|---|
| Refractory material | ISOSAT ® 150 | 1000 | 1000 |
| Refractory component | B36 composite particles | 174 | — |
| Refractory component | Lightweight fireclay of grain size of 0.1-4 mm | 217 | 391 |
| Refractory component | Aluminum oxide, calcined | 261 | 261 |
| Refractory component | Kyanite | 87 | 87 |
| Binder component | Calcium aluminate | 130 | 130 |
| Water | | 130 | 130 |

(a) producing composite particles having a grain size of less than 5 mm, determined by sieving, in a matrix encapsulation process having the following steps:
- (a1) producing droplets of a suspension composed of at least the following starting materials:
  as dispersed phases
  - (i) one or more refractory substances selected from the group consisting of refractory solids and precursors of refractory solids,
  - (ii) additionally one or more density-reducing substances selected from the group consisting of lightweight fillers having a respective bulk density in the range from 10 to 350 g/L and pyrolyzable fillers,
    wherein the one or more lightweight fillers are selected from the group consisting of inorganic hollow beads, organic hollow beads, particles of porous materials, particles of foamed materials, rice husk ash, core-shell particles, calcined kieselguhr, and combinations thereof;
  and as continuous phase
  - (iv) a solidifiable liquid,
    wherein the solidifiable liquid is a liquid solidifiable by cation exchange reaction,
- (a2) solidifying the solidifiable liquid by cation exchange reaction, such that the droplets harden to give hardened droplets and the refractory substance(s) and the density-reducing substance(s) are encapsulated in the solidifying continuous phase,
- (a3) treating the hardened droplets so as to result in said composite particles, the treating comprising a thermal treatment,
so that the composite particles produced in step (a3) have:
- (A) thermal stability at a temperature of 1600° C. or higher, determined by a sintering test
- (C) a grain strength >1.5 N/mm², determined according to EN 13055-1, Annex A, Method 1, at a grain size in the range of 0.25-0.5 mm, and
- (D) a bulk density <750 g/L,
wherein the process comprises as an additional step:
- (b) mixing the composite particles produced in step (a3) with a binder comprising a binder component selected from the group consisting of
  alumina cements,
  calcium aluminate cements,
  monoaluminum phosphate or solution of monoaluminum phosphate,
  monomagnesium phosphate or solution of monomagnesium phosphate,
  phosphoric acid,
  inorganic phosphate,
  boron compounds,
  magnesium sulfate or solution of magnesium sulfate,
  silica sol,
  sols of aluminum oxide,
  plastic clays,
  hydratable aluminum oxide binder,
  ethyl silicate and
  aluminum sulfate.

2. The process as claimed in claim 1 for producing an insulating product for the refractory industry or an insulating material as intermediate for producing such a product wherein step (a1) further comprises as starting material as dispersed phase:
(iii) colloidal silicon dioxide in addition to constituents (i) and (ii).

3. The process as claimed in claim 2, wherein the colloidal silicon dioxide (iii) is an anionic colloidal silicon dioxide and/or
the colloidal silicon dioxide (iii) is a dispersion comprising
an aqueous continuous phase and
a dispersed phase comprising nanoparticulate silicon dioxide, having an average particle size in the range from 5 to 30 nm.

4. The process as claimed in claim 1, wherein in step (a1) droplets are provided by means of one or more nozzles and/or
the solidifiable liquid is a liquid solidifiable by reaction with calcium ions, comprising one or more binders selected from the group consisting of alginate, PVA, chitosan and sulfoxyethyl cellulose,
and/or
the solidifiable liquid is an aqueous alginate solution, and/or
the one or more lightweight fillers used in step (a) as density-reducing substance of component (ii) has a grain size of less than 0.8 mm, determined by sieving; and/or
the or at least one of the pyrolyzable fillers used in step (a) as component (ii) is selected from the group consisting of:
polymer beads and
styrofoam beads.

5. The process as claimed in claim 1, wherein
The one or more refractory solids used in step (a1) as the refractory substance of component (i) is selected from the group consisting of:
oxides, nitrides and carbides, each comprising one or more elements from the group consisting of Si, Al, Zr, Ti, Mg and Ca, and
mixed oxides, mixed carbides and mixed nitrides, each comprising one or more elements from the group consisting of Si, Al, Zr, Ti, Mg and Ca,
the precursor or at least one of the precursors of refractory solids used in step (a1) as refractory substance of component (i) is selected from the group consisting of
aluminum hydroxide,
magnesium hydroxide,
sheet silicates,
clays,
phosphates, and
carbonates.

6. The process as claimed in claim 1, comprising, as an additional step,
(c) producing the insulating product for the refractory industry or the insulating material as intermediate for production of such a product using the composite particles from step (a).

7. The process as claimed in claim 1, wherein
the treating in step (a3) is conducted in such a way that the bulk density of the resulting composite particles is lower than the bulk density of the hardened droplets in the dried state, and/or
said composite particles have a bulk density <750 g/L, and/or
at least some of the resultant composite particles in step (a3) and/or the composite particles used in step (b) have a grain size of less than 2 mm, determined by sieving, and/or
the resultant composite particles in step (a3) are characterized by (B) a thermal conductivity value at room temperature (20° C.) λR of ≤0.26 W/m*K, and/or (E) a grain size of not more than 5.0 mm, determined by sieving, and/or (F) a water absorption capacity, determined via water absorption according to Enslin, of ≤4.5, mL/g.

8. The process as claimed in claim 1, for producing an insulating product for the refractory industry or an insulating material as intermediate for producing such a product, comprising:

in step (b) or in a further step after step (a), mixing with one or more further substances to produce a curable refractory composition, and optionally curing the curable refractory composition.

9. The process as claimed in claim 1, wherein
component (i) comprises, as refractory substances, one or more precursors of refractory solids and the treating in step (a3) comprises a thermal treatment in which the precursors are converted to a refractory solid; and/or
the hardened droplets are treated in step (a3), so as to result in solid particles as intermediate, and wherein the surface of these solid particles is subsequently sealed, preferably by means of an organic coating composition or a silicon-containing binder, so as to result in said composite particles.

10. The process as claimed in claim 6, wherein in step (b), the composite particles produced in step (a) are mixed
with a binder comprising a binder component selected from the group consisting of
alumina cements,
calcium aluminate cements,
monoaluminum phosphate or solution of monoaluminum phosphate,
monomagnesium phosphate or solution of monomagnesium phosphate,
phosphoric acid,
inorganic phosphate,
boron compounds,
magnesium sulfate or solution of magnesium sulfate,
silica sol, and
sols of aluminum oxide.

11. The process as claimed in claim 6,
wherein the insulating product for the refractory industry or the insulating material as intermediate for production of such a product is selected from the group shaped and unshaped refractory products, and shaped and unshaped highly refractory products.

12. The process as claimed in claim 1, wherein component (i) comprises, as refractory substances, one or more precursors of refractory solids and the treating in step (a3) comprises a thermal treatment in which the precursors are converted to a refractory solid,
wherein the precursor or at least one of the precursors of refractory solids is a clay and the treating in step (a3) comprises a thermal treatment at a temperature in the range from 900 to 980° C., such that the clay is converted to a refractory solid.

13. The process as claimed in claim 12, wherein the clay contains kaolinite and/or illite.

14. The process as claimed in claim 1, wherein the at least one of the refractory solids used in step (a1) as refractory substance of component (i) is selected from the group consisting of
aluminum oxide,
zirconium oxide,
titanium dioxide,
silicon dioxide,
magnesium oxide,
calcium oxide,
calcium silicate,
sheet silicates,
aluminum silicates,
magnesium aluminum silicate,
silicon carbide, and
boron nitride; and/or
component (i) comprises, as refractory substances, one or more precursors of refractory solids and the treating in step (a3) comprises a thermal treatment in which the precursors are converted to a refractory solid, wherein the precursor or at least one of the precursors of refractory solids is a clay and the treating in step (a3) comprises a thermal treatment at a temperature in the range from 900 to 980° C., such that the clay is converted to a refractory solid, wherein the clay contains kaolinite and/or illite.

* * * * *

UNITED STATES PATENT AND TRADEMARK OFFICE
CERTIFICATE OF CORRECTION

| | |
|---|---|
| PATENT NO. | : 11,267,760 B2 |
| APPLICATION NO. | : 16/617329 |
| DATED | : November 26, 2019 |
| INVENTOR(S) | : Sandra Lehmann et al. |

It is certified that error appears in the above-identified patent and that said Letters Patent is hereby corrected as shown below:

In the Claims

In Column 38, Line 39 of Claim 5 reads "consisting of Si, Al, Zr, Ti, Mg and Ca," but should read -- consisting of Si, Al, Zr, Ti, Mg and Ca, and/or --

Signed and Sealed this
Twentieth Day of September, 2022

Katherine Kelly Vidal
*Director of the United States Patent and Trademark Office*